(12) United States Patent
Tamura et al.

(10) Patent No.: US 11,319,393 B2
(45) Date of Patent: May 3, 2022

(54) PHOTO-ALIGNABLE POLYMER, BINDER COMPOSITION, BINDER LAYER, OPTICAL LAMINATE, METHOD FOR PRODUCING OPTICAL LAMINATE, AND IMAGE DISPLAY DEVICE

(71) Applicant: FUJIFILM Corporation, Tokyo (JP)

(72) Inventors: Akio Tamura, Minami-ashigara (JP); Reiko Inushima, Minami-ashigara (JP); Takashi Iizumi, Minami-ashigara (JP); Yutaka Nozoe, Minami-ashigara (JP); Hideyuki Nishikawa, Minami-ashigara (JP); Kazushige Nakagawa, Minami-ashigara (JP); Kunihiro Atsumi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 28 days.

(21) Appl. No.: 16/682,947

(22) Filed: Nov. 13, 2019

(65) Prior Publication Data

US 2020/0079885 A1 Mar. 12, 2020

Related U.S. Application Data

(63) Continuation of application No. PCT/JP2018/020222, filed on May 25, 2018.

(30) Foreign Application Priority Data

May 26, 2017 (JP) .............................. JP2017-104648
Sep. 8, 2017 (JP) .............................. JP2017-173157

(51) Int. Cl.
| | |
|---|---|
| *C08F 20/40* | (2006.01) |
| *C08F 222/10* | (2006.01) |
| *C08F 20/30* | (2006.01) |
| *C08F 20/38* | (2006.01) |
| *C08L 63/00* | (2006.01) |
| *C09K 19/56* | (2006.01) |
| *G02B 5/30* | (2006.01) |
| *C08F 220/30* | (2006.01) |

(52) U.S. Cl.
CPC .......... *C08F 222/102* (2020.02); *C08F 20/30* (2013.01); *C08F 20/38* (2013.01); *C08F 20/40* (2013.01); *C08F 220/303* (2020.02); *C08L 63/00* (2013.01); *C09K 19/56* (2013.01); *G02B 5/3016* (2013.01)

(58) Field of Classification Search
CPC .......... C08F 20/40; C08F 20/30; C08F 20/38; C08F 2810/50; C08F 2800/10; C08F 2/48; C08F 8/14; C08F 222/102; C08F 220/24; C08F 220/20; C08F 220/06; C08F 220/325; C08F 265/06; C08L 63/00; C09K 19/56; C09K 19/3491; C09K 19/586; C09K 2019/528; G02B 5/3016; C09D 175/16; C09D 4/06; C08G 18/8116; C08G 18/6229

See application file for complete search history.

(56) References Cited

U.S. PATENT DOCUMENTS

| | | | |
|---|---|---|---|
| 2012/0082805 A1 | 4/2012 | Hatanaka et al. | |
| 2014/0121292 A1* | 5/2014 | Kodama .................. | C09D 4/00 522/64 |

(Continued)

FOREIGN PATENT DOCUMENTS

| | | |
|---|---|---|
| JP | 2001-323266 A | 11/2001 |
| JP | 2006-16599 A | 1/2006 |
| JP | 2012-3114 A | 1/2012 |

(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2018/020222. dated Dec. 5, 2019, with English translation of the Written Opinion.

(Continued)

*Primary Examiner* — Anthony J Frost
(74) *Attorney, Agent, or Firm* — Birch, Stewart, Kolasch & Birch, LLP

(57) ABSTRACT

An object of the present invention is to provide a photo-alignable polymer which has excellent coating properties, is capable of suppressing film thickness unevenness, and has excellent upper layer coating properties and good liquid crystal alignment properties after being formed as a layer; a binder composition; a binder layer; an optical laminate; a method for producing an optical laminate; and an image display device. The photo-alignable polymer of an embodiment of the present invention is a photo-alignable polymer having a repeating unit A including a cleavage group capable of decomposing by an action of at least one selected from the group consisting of light, heat, an acid, and a base to generate a polar group, in which the repeating unit A has the cleavage group in a side chain, has a fluorine atom or a silicon atom on a side closer to a terminal than the cleavage group in the side chain, and the photo-alignable polymer satisfies Condition 1 or Condition 2 shown below.

Condition 1: The photo-alignable polymer further has a repeating unit B including a photo-alignable group, in addition to the repeating unit A.

Condition 2: The repeating unit A includes a photo-alignable group on a side closer to the main chain than the cleavage group in the side chain.

14 Claims, No Drawings

(56) References Cited

U.S. PATENT DOCUMENTS

2015/0241737 A1\* 8/2015 Jang .................. C08L 45/00
                                                    522/39
2016/0349614 A1\* 12/2016 Wright ................ G03F 7/0758

FOREIGN PATENT DOCUMENTS

| JP | 2013-71945 A | 4/2013 |
|----|----|----|
| JP | 2015-206010 A | 11/2015 |
| JP | 2017-49327 A | 3/2017 |
| JP | 2017-193654 A | 10/2017 |
| WO | WO 2010/150748 A1 | 12/2010 |
| WO | WO 2017/183682 A | 10/2017 |

OTHER PUBLICATIONS

International Search Report (Form PCT/ISA/210) for International Application No. PCT/JP2018/020222, dated Aug. 28, 2018, with English translation.

\* cited by examiner

PHOTO-ALIGNABLE POLYMER, BINDER COMPOSITION, BINDER LAYER, OPTICAL LAMINATE, METHOD FOR PRODUCING OPTICAL LAMINATE, AND IMAGE DISPLAY DEVICE

CROSS-REFERENCE TO RELATED APPLICATIONS

This application is a Continuation of PCT International Application No. PCT/JP2018/020222 filed on May 25, 2018, which claims priority under 35 U.S.C. § 119(a) to Japanese Patent Application No. 2017-104648 filed on May 26, 2017 and Japanese Patent Application No. 2017-173157 filed on Sep. 8, 2017. Each of the above applications is hereby expressly incorporated by reference, in its entirety, into the present application.

BACKGROUND OF THE INVENTION

1. Field of the Invention

The present invention relates to a photo-alignable polymer, a binder composition, a binder layer, an optical laminate, a method for producing an optical laminate, and an image display device.

2. Description of the Related Art

Optical films such as an optical compensation sheet and a phase difference film have been used for various image display devices from the viewpoint of solving image coloration, widening a viewing angle, and the like.

A stretched birefringent film has been used as the optical film, but it has recently been proposed to use an optically anisotropic layer using a liquid crystal compound instead of the stretched birefringent film.

With regard to such an optically anisotropic layer, it is known to provide an alignment film on a support on which an optically anisotropic layer is formed, in order to align a liquid crystal compound, and a photo-alignment film which has been subjected to a photo-alignment treatment instead of a rubbing treatment is known as the alignment film.

For example, WO2010/150748A discloses a liquid crystal alignment layer which is formed of a thermosetting film forming composition containing an acrylic copolymer having a photodimerizing moiety such as a cinnamoyl group, and a crosslinking agent ([claim 1], [claim 3], [claim 11], and [0028]).

SUMMARY OF THE INVENTION

The present inventors have studied on more rapid preparation of an optical laminate having the liquid crystal alignment layer described in WO2010/150748A and the like and an optically anisotropic layer which is provided on an upper layer of the liquid crystal alignment layer and formed using a polymerizable liquid crystal composition, and they have thus found that in case of using a known fluorine-based surfactant in the formation of a liquid crystal alignment layer, the coating properties are good and the film thickness unevenness (hereinafter also referred to as "wind unevenness") caused by drying wind during drying can also be suppressed, but the present inventors have revealed that depending on the type of the fluorine-based surfactant to be used, there are some cases where the coating properties of a composition for an optically anisotropic layer provided on the upper layer of the formed liquid crystal alignment layer (hereinafter also referred to as "upper layer coating properties") are deteriorated or where the alignment properties of the formed optically anisotropic layer (hereinafter also referred to as "liquid crystal alignment properties") are deteriorated.

Therefore, an object of the present invention is to provide a photo-alignable polymer which has excellent coating properties, is capable of suppressing film thickness unevenness, and has excellent upper layer coating properties and good liquid crystal alignment properties after being formed as a layer; a binder composition; a binder layer; an optical laminate; a method for producing an optical laminate; and an image display device.

The present inventors have conducted extensive studies so as to accomplish the object, and as a result, they have found that in a case where a photo-alignable polymer which has a repeating unit including a cleavage group capable of decomposing by an action of light or the like to generate a polar group in a side chain, has a fluorine atom or a silicon atom on a side closer to a terminal than the cleavage group in the side chain, and has a photo-alignable group such that predetermined conditions are satisfied is blended, the coating properties are excellent, the film thickness unevenness can be suppressed, and after being formed as a layer, the upper layer coating properties are excellent, and the liquid crystal alignment properties are also good, thereby completing the present invention.

That is, the present inventors have found that it is possible to accomplish the object by the following configurations.

[1] A photo-alignable polymer comprising a repeating unit A including a cleavage group capable of decomposing by an action of at least one selected from the group consisting of light, heat, an acid, and a base to generate a polar group, in which the repeating unit A has the cleavage group in a side chain and has a fluorine atom or a silicon atom on a side closer to a terminal than the cleavage group in the side chain, and the photo-alignable polymer satisfies Condition 1 or Condition 2 shown below:

Condition 1: the photo-alignable polymer further has a repeating unit B including a photo-alignable group, in addition to the repeating unit A; and Condition 2: the repeating unit A includes a photo-alignable group on a side closer to the main chain than the cleavage group in the side chain.

[2] The photo-alignable polymer as described in [1],
in which the photo-alignable polymer satisfies Condition 1, the repeating unit A is a repeating unit represented by Formula (1) which will be described later or a repeating unit represented by Formula (2-1) or (2-2) which will be described later, and the repeating unit B is a repeating unit represented by Formula (3) which will be described later or a repeating unit represented by Formula (4-1) or (4-2) which will be described later.

[3] The photo-alignable polymer as described in [1],
in which the photo-alignable polymer satisfies Condition 2, and the repeating unit A is a repeating unit represented by Formula (5) which will be described later or a repeating unit represented by Formula (6-1) or (6-2) which will be described later.

[4] The photo-alignable polymer as described in [2],
in which RK in Formulae (1), (2-1), and (2-2) is a cleavage group represented by any one of Formula (rk-1), . . . , or (rk-13).

[5] The photo-alignable polymer as described in [3],
in which RK in Formulae (5), (6-1), and (6-2) is a cleavage group represented by any one of Formula (rk-1), . . . , or (rk-13) which will be described later.

[6] The photo-alignable polymer as described in [2] or [4],
in which the photo-alignable polymer satisfies Condition 1, and the repeating unit A is a repeating unit represented by Formula (7) which will be described later, and the repeating unit B is a repeating unit represented by Formula (8) which will be described later.

[7] A binder composition comprising:
a binder; and the photo-alignable polymer as described in any one of [1] to [6].

[8] A binder layer formed using the binder composition as described in [7].

[9] An optical laminate comprising:
the binder layer as described in [8]; and
an optically anisotropic layer provided on the binder layer,
in which the optically anisotropic layer is formed using a polymerizable liquid crystal composition containing a polymerizable liquid crystal compound, and
the binder layer and the optically anisotropic layer are laminated in adjacent to each other.

[10] A method for producing an optical laminate, for the preparation of the optical laminate as described in [9], comprising:
a first applying step of applying the binder composition as described in [7] onto a support;
a binder layer forming step of forming a binder layer after the first applying step;
an action performing step of performing an action of at least one selected from the group consisting of light, heat, an acid, and a base;
a light irradiating step of irradiating polarized light or unpolarized light;
a second applying step of directly applying a polymerizable liquid crystal composition for forming an optically anisotropic layer onto the binder layer; and
an optically anisotropic layer forming step of forming an optically anisotropic layer after the second applying step,
in which the action performing step is a step performed between the binder layer forming step and the second applying step or performed at the same time with the binder layer forming step or the second applying step, and
the light irradiating step is a step performed between the binder layer forming step and the second applying step or performed at the same time with the binder layer forming step or the second applying step.

[11] An image display device comprising the binder layer as described in [8] or the optical laminate as described in [9].

According to the present invention, it is possible to provide a photo-alignable polymer which has excellent coating properties, is capable of suppressing film thickness unevenness, and has excellent upper layer coating properties and good liquid crystal alignment properties after being formed as a layer; a binder composition; a binder layer; an optical laminate; a method for producing an optical laminate; and an image display device.

DESCRIPTION OF THE PREFERRED EMBODIMENTS

Hereinafter, the present invention will be described in detail.

Description of configuration requirements described below may be made on the basis of representative embodiments of the present invention in some cases, but the present invention is not limited to such embodiments.

Furthermore, in the present specification, a numerical value range expressed using "to" means a range that includes the preceding and succeeding numerical values of "to" as the lower limit value and the upper limit value, respectively.

Photo-Alignable Polymer

The photo-alignable polymer of an embodiment of the present invention is a photo-alignable polymer having a repeating unit A including a cleavage group capable of decomposing by an action of at least one selected from the group consisting of light, heat, an acid, and a base to generate a polar group.

Furthermore, in the photo-alignable polymer of the embodiment of the present invention, the repeating unit A has the cleavage group in a side chain and has a fluorine atom or a silicon atom on a side closer to a terminal than the cleavage group in the side chain.

In addition, the photo-alignable polymer of the embodiment of the present invention has a photo-alignable group in an aspect in which the photo-alignable polymer satisfies Condition 1 or Condition 2 shown below.

Condition 1: The photo-alignable polymer further has a repeating unit B including a photo-alignable group, in addition to the repeating unit A.

Condition 2: The repeating unit A includes a photo-alignable group on a side closer to the main chain than the cleavage group in the side chain.

Here, the "polar group" included in the repeating unit A refers to a group having at least one or more heteroatoms or halogen atoms, and specific examples thereof include a hydroxyl group, a carbonyl group, a carboxy group, an amino group, a nitro group, an ammonium group, and a cyano group. Among those, the hydroxyl group or the carboxy group is preferable.

In addition, a "cleavage group capable of generating a polar group" refers to a group capable of generating the above-mentioned polar group by cleavage, but in the present invention, the cleavage group also includes a group that reacts with an oxygen molecule after radical cleavage to produce a polar group.

In the present invention, in a case where a photo-alignable polymer which has a repeating unit including a cleavage group capable of decomposing by an action of light or the like to generate a polar group in a side chain, has a fluorine atom or a silicon atom on a side closer to a terminal than the cleavage group in the side chain, and has a photo-alignable group such that predetermined conditions are satisfied, is blended as described above, the coating properties are excellent, the film thickness unevenness can be suppressed, and after being formed as a layer, the upper layer coating properties are excellent, and the liquid crystal alignment properties are also good.

Details thereof are not clear, but are presumed as follows by the present inventors.

That is, in a case where a composition containing the photo-alignable polymer of the embodiment of the present invention is applied, the photo-alignable polymer of the embodiment of the present invention having a fluorine atom or a silicon atom in a side chain itself acts as a surfactant or a leveling agent, whereby the coating properties are good and the film thickness unevenness can be suppressed.

Furthermore, it is considered that by performing an action of at least one selected from the group consisting of light, heat, an acid, and a base with respect to the photo-alignable polymer of the embodiment of the present invention which is unevenly distributed on the air interface side after being formed as a layer such as a binder layer, a cleavage group included in the side chain decomposes to generate a polar group, a substituent including a fluorine atom or a silicon atom on a side closer to a terminal than the cleavage group in the side chain leaves, and accordingly, the upper layer coating properties are good.

In addition, it is considered that by subjecting the photo-alignable polymer of the embodiment of the present invention unevenly distributed on the air interface side after being formed as a layer such as a binder layer and an optically anisotropic layer to light irradiation to align the photo-alignable group, the liquid crystal alignment properties of the optically anisotropic layer formed on the upper layer are good.

In a case where the photo-alignable polymer of the embodiment of the present invention satisfies Condition 1, it is preferable that the repeating unit A is a repeating unit represented by Formula (1) or a repeating unit represented by Formula (2-1) or (2-2), and the repeating unit B is a repeating unit represented by Formula (3) or a repeating unit represented by Formula (4-1) or (4-2) for a reason that the film thickness unevenness (wind unevenness) can further be suppressed.

Among those, it is more preferable that the repeating unit A is the repeating unit represented by Formulae (1) and the repeating unit B is the repeating unit represented by Formula (3).

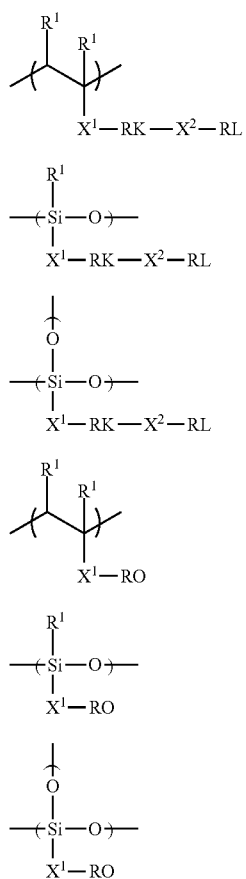

In Formulae (1), (2-1), (3), and (4-1), $R^1$ represents a hydrogen atom or an alkyl group having 1 to 3 carbon atoms, and a plurality of $R^1$'s in Formulae (1) and (3) may be the same as or different from each other.

As $R^1$, a hydrogen atom or a methyl group is preferable.

Moreover, in Formulae (1), (2-1), and (2-2), $X^1$ and $X^2$ each independently represent a single bond or a divalent linking group, RK represents a cleavage group, and RL represents a monovalent organic group including a fluorine atom or a silicon atom.

Examples of the divalent linking group represented by each of $X^1$ and $X^2$ in Formulae (1), (2-1), and (2-2) include at least one or more groups selected from the group consisting of a linear, branched, or cyclic alkylene group having 1 to 10 carbon atoms, which may have a substituent, an arylene group having 6 to 12 carbon atoms, which may have a substituent, an ether group (—O—), a carbonyl group (—C(=O)—), and an imino group (—NH—) which may have a substituent.

Here, examples of the substituent which may be contained in the alkylene group, the arylene group, and the imino group include an alkyl group, an alkoxy group, a halogen atom, and a hydroxyl group.

As the alkyl group, for example, a linear, branched, or cyclic alkyl group having 1 to 18 carbon atoms is preferable, an alkyl group having 1 to 8 carbon atoms (for example, a methyl group, an ethyl group, a propyl group, an isopropyl group, an n-butyl group, an isobutyl group, a sec-butyl group, a t-butyl group, and a cyclohexyl group) is more preferable, an alkyl group having 1 to 4 carbon atoms is still more preferable, and a methyl group or an ethyl group is particularly preferable.

As the alkoxy group, for example, an alkoxy group having 1 to 18 carbon atoms is preferable, an alkoxy group having 1 to 8 carbon atoms (for example, a methoxy group, an ethoxy group, an n-butoxy group, and a methoxyethoxy group) is more preferable, an alkoxy group having 1 to 4 carbon atoms is still more preferable, and a methoxy group or an ethoxy group is particularly preferable.

Examples of the halogen atom include a fluorine atom, a chlorine atom, a bromine atom, and an iodine atom, and among these, the fluorine atom or the chlorine atom is preferable.

With regard to the linear, branched, or cyclic alkylene group having 1 to 10 carbon atoms, specific examples of the linear alkylene group include a methylene group, an ethylene group, a propylene group, a butylene group, a pentylene group, a hexylene group, and a decylene group.

Furthermore, specific examples of the branched alkylene group include a dimethylmethylene group, a methylethylene group, a 2,2-dimethylpropylene group, and a 2-ethyl-2-methylpropylene group.

In addition, specific examples of the cyclic alkylene group include a cyclopropylene group, a cyclobutylene group, a cyclopentylene group, a cyclohexylene group, a cyclooctylene group, a cyclodecylene group, an adamantane-diyl group, a norbornane-diyl group, and an exo-tetrahydrodicyclopentadiene-diyl group, and among these, the cyclohexylene group is preferable.

Specific examples of the arylene group having 6 to 12 carbon atoms include a phenylene group, a xylylene group, a biphenylene group, a naphthylene group, and a 2,2'-methylenebisphenyl group, and among these, the phenylene group is preferable.

Examples of the cleavage group represented by RK in Formulae (1), (2-1), and (2-2) include a cleavage group (bond) represented by any one of Formula (rk-1), . . . or (rk-13).

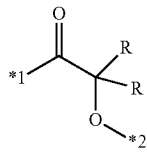
(rk-1)

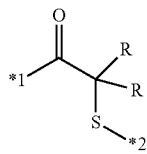
(rk-2)

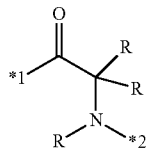
(rk-3)

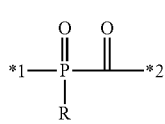
(rk-4)

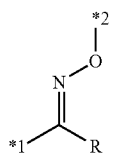
(rk-5)

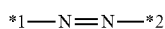
(rk-6)

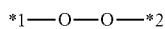
(rk-7)

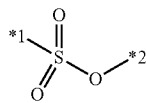
(rk-8)

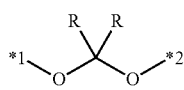
(rk-9)

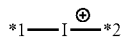
(rk-10)

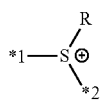
(rk-11)

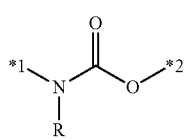
(rk-12)

-continued

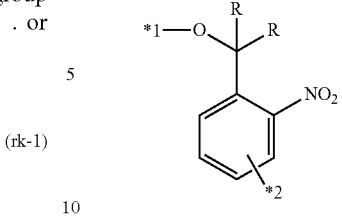
(rk-13)

In Formulae (rk-1) to (rk-13), *1 represents a binding position to any one of $X^1$ or $X^2$ in Formulae (1), (2-1), and (2-2), *2 represents a binding position to the other of $X^1$ or $X^2$ not bonded to *1 in Formulae (1), (2-1), and (2-2), and R's each independently represent a hydrogen atom or a monovalent organic group.

Here, examples of the monovalent organic group represented by R include a chained or cyclic alkyl group having 1 to 20 carbon atoms and an aryl group having 6 to 20 carbon atoms, which may have a substituent.

Moreover, the anion moieties in Formulae (rk-10) and (rk-11) are not particularly limited since they do not affect the cleavage, and can be used in any of inorganic anions and organic anions.

Specific examples of the inorganic anion include halide ions such as a chloride ion and a bromide ion; and sulfonate anions.

Specific examples of the organic anion include carboxylate anions such as an acetate anion; and organic sulfonate anions such as a methanesulfonate anion and a paratoluenesulfonate anion.

In the present invention, among these cleavage groups, in a case of performing cleavage using light, the cleavage group represented by Formula (rk-1) is preferable from the viewpoint of quantum efficiency, and in a case of performing cleavage using an acid, the cleavage group represented by Formula (rk-9) is preferable from the viewpoint of a cleavage rate.

Examples of the monovalent organic group including a fluorine atom or a silicon atom represented by RL in Formulae (1), (2-1), and (2-2) include an alkyl group having 1 to 20 carbon atoms or an alkenyl group having 2 to 20 carbon atoms, in which at least one carbon atom has a fluorine atom as a substituent.

Moreover, in Formulae (3), (4-1), and (4-2), $X^1$ represents a single bond or a divalent linking group, and RO represents a photo-alignable group.

Examples of the divalent linking group represented by $X^1$ in Formulae (3), (4-1), and (4-2) include the same ones as those of $X^1$ in Formulae (1), (2-1), and (2-2).

The photo-alignable group represented by RO in Formulae (3), (4-1), and (4-2) refers to a group having a photo-alignment function that induces rearrangement or an isotropic chemical reaction by irradiation with light having anisotropy (for example, plane-polarized light), and is preferably a photo-alignable group capable of causing at least one of dimerization or isomerization by an action of light for a reason that the uniformity of alignment is excellent and the thermal stability or chemical stability is also good.

Here, specific suitable examples of the photo-alignable group that undergoes dimerization by an action of light include a group having a skeleton of at least one derivative selected from the group consisting of cinnamic acid derivatives (M. Schadt et al., J. Appl. Phys., Vol. 31, No. 7, page 2155 (1992)), coumarin derivatives (M. Schadt et al., Nature, Vol. 381, page 212 (1996)), chalcone derivatives (Toshihiro Ogawa, et. al., Proceedings of Japanese Liquid Crystal Society Annual Meeting, 2AB03 (1997)), maleimide derivatives, and benzophenone derivatives (Y. K. Jang et al., SID Int. Symposium Digest, P-53 (1997)).

On the other hand, specific suitable examples of the photo-alignable group that undergoes isomerization by an action of light include a group having a skeleton of at least one compound selected from the group consisting of azobenzene compounds (K. Ichimura et al., Mol. Cryst. Liq. Cryst., 298, 221 (1997)), stilbene compounds (J. G. Victor and J. M. Torkelson, Macromolecules, 20, 2241 (1987)), spiropyran compounds (K. Ichimura et al., Chemistry Letters, page 1063 (1992); K. Ichimura et al., Thin Solid Films, Vol. 235, page 101 (1993)), cinnamic acid compounds (K. Ichimura et al., Macromolecules, 30, 903 (1997)), and hydrazino-β-ketoester compounds (S. Yamamura et al., Liquid Crystals, Vol. 13, No. 2, page 189 (1993)).

Among these, the photo-alignable group is preferably a group having a skeleton of at least one derivative selected from the group consisting of the cinnamic acid derivatives, the coumarin derivatives, the chalcone derivatives, the maleimide derivatives, the azobenzene compounds, the stilbene compounds, and the spiropyran compounds, and more preferably a group having a skeleton of the cinnamic acid derivatives or the coumarin derivatives.

In a case where the photo-alignable polymer of the embodiment of the present invention satisfies Condition 1, upon the cleavage using an acid, it is preferable that repeating unit A is a repeating unit represented by Formula (7) and the repeating unit B is a repeating unit represented by Formula (8) from the viewpoints of a cleavage rate and ease of synthesis.

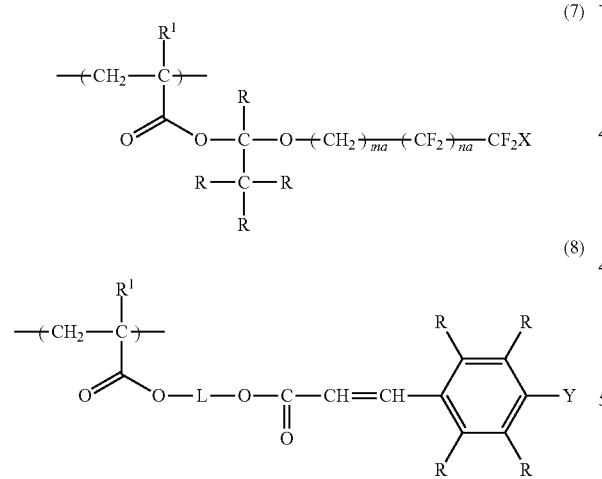

In Formulae (7) and (8), $R^1$ represents a hydrogen atom or an alkyl group having 1 to 3 carbon atoms, R represents a hydrogen atom or a monovalent organic group, and a plurality of R's may be the same as or different from each other.

Furthermore, in Formula (7), X represents a hydrogen atom or a fluorine atom, and ma and na each independently represent an integer of 1 to 20.

In addition, in Formula (8), L represents a divalent linking group, and Y represents a hydrogen atom or a monovalent organic group.

Here, examples of the monovalent organic group represented by each of R and Y include a chained or cyclic alkyl group having 1 to 20 carbon atoms, and an aryl group having 6 to 20 carbon atoms, which may have a substituent.

$R^1$ in Formula (7) is preferably a hydrogen atom or a methyl group.

Furthermore, R in Formula (7) is preferably a hydrogen atom.

Moreover, ma in Formula (7) is preferably 1 or 2, and na is preferably 3 to 7.

In addition, X in Formula (7) is preferably a fluorine atom.

Examples of the repeating unit A represented by Formula (7) include a repeating unit obtained by the polymerization of any one of monomers represented by Formulae (7-1) to (7-6).

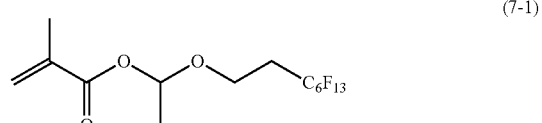

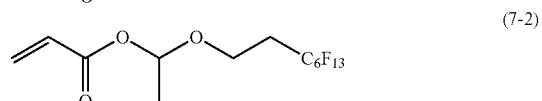

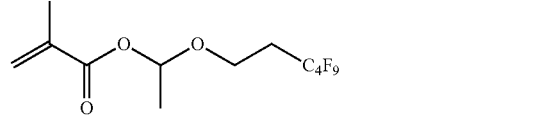

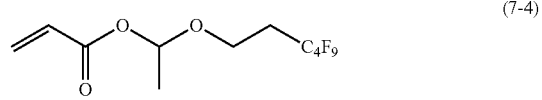

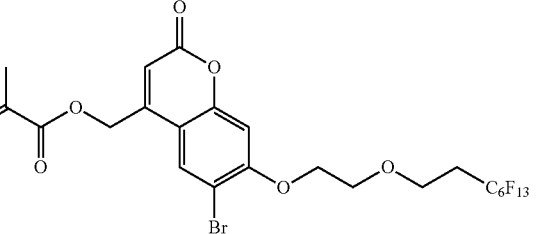

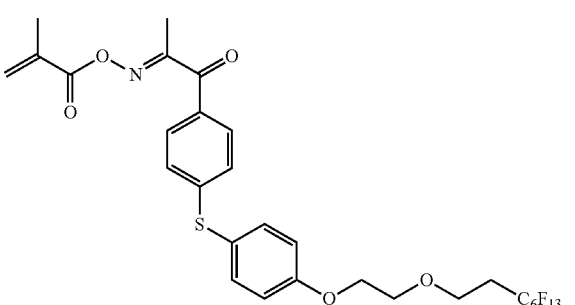

$R^1$ in Formula (8) is preferably a hydrogen atom or a methyl group.

Furthermore, R in Formula (8) is preferably a hydrogen atom.

Moreover, examples of the divalent linking group represented by L in Formula (8) include a divalent linking group at least one selected from the group consisting of a substituted or unsubstituted aliphatic chained group, a substituted or unsubstituted aliphatic cyclic group, a substituted or unsubstituted aryl group, and a substituted or unsubstituted heteroaryl group, and among these, the aliphatic chained group, the aliphatic cyclic group, or a combination thereof is preferable, and an aliphatic chained group or aliphatic cyclic group having 2 to 8 carbon atoms is more preferable.

In addition, Y in Formula (8) is preferably a hydrogen atom, a methoxy group, or a cyclohexyl group.

Examples of the repeating unit B represented by Formula (8) include a repeating unit obtained by the polymerization of any one of monomers represented by Formulae (8-1) to (8-6).

(8-1)
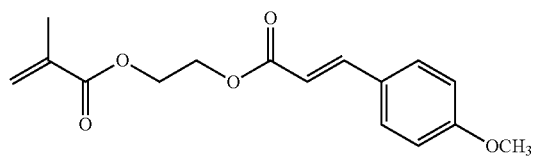

(8-2)
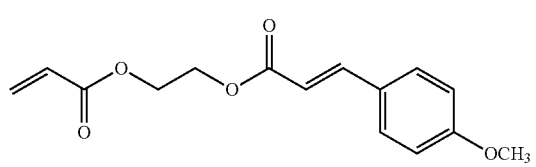

(8-3)
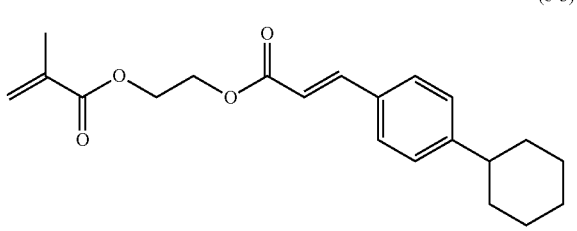

(8-4)
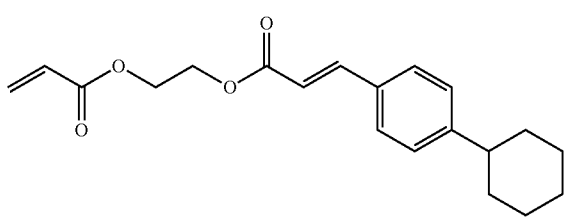

(8-5)
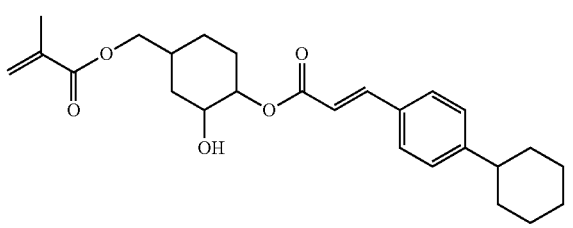

(8-6)
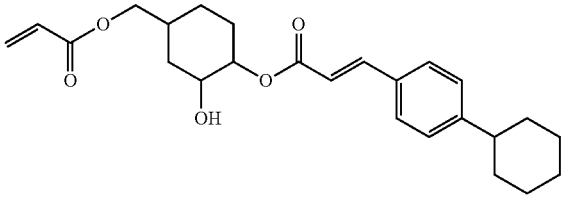

In a case where the photo-alignable polymer of the embodiment of the present invention satisfies Condition 1, it may have other repeating units, in addition to the above-mentioned repeating unit A and repeating unit B.

Examples of a monomer (radically polymerizable monomer) that forms such other repeating units include an acrylic acid ester compound, a methacrylic acid ester compound, a maleimide compound, an acrylamide compound, an acrylonitrile, a maleic acid anhydride, a styrene compound, and a vinyl compound.

Specific examples of the photo-alignable polymer of the embodiment of the present invention, which satisfies Condition 1, include a copolymer formed using any one of monomers represented by Formulae (7-1) to (7-6), any one of monomers represented by Formulae (8-1) to (8-6), and any other repeating units, and among these, copolymers represented by Formulae C-1 to C-5 are suitable.

C-1
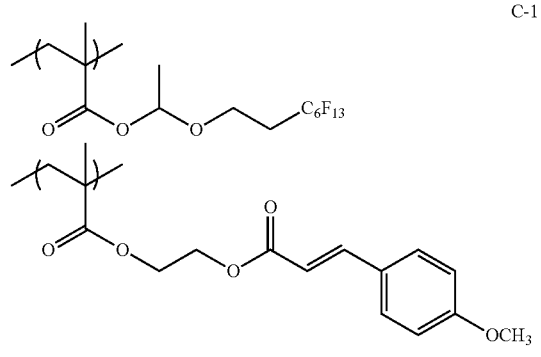
Copolymer

C-2
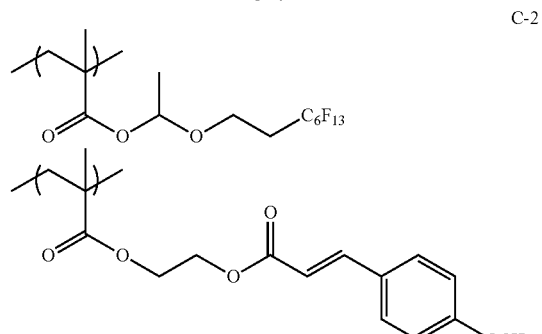

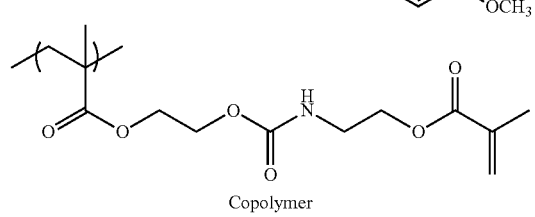
Copolymer

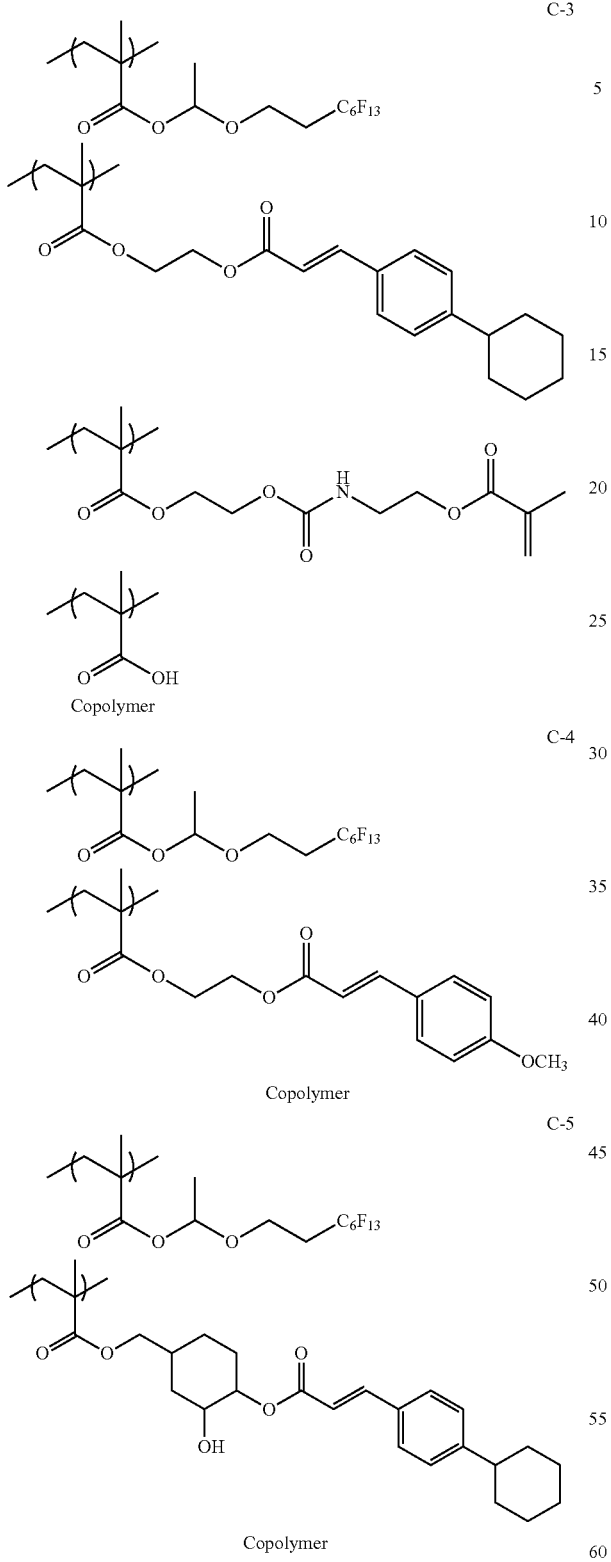

repeating unit represented by Formula (5) or a repeating unit represented by Formula (6-1) or (6-2).

Among those, it is more preferable that the repeating unit A is a repeating unit represented by Formula (5).

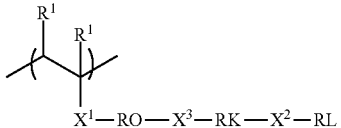

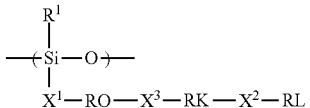

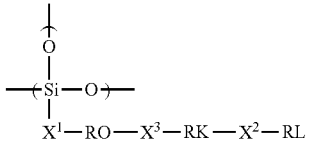

In Formulae (5) and (6-1), $R^1$ represents a hydrogen atom or an alkyl group having 1 to 3 carbon atoms, and a plurality of $R^1$'s in Formula (5) may be the same as or different from each other.

$R^1$ is preferably a hydrogen atom or a methyl group.

Moreover, in Formulae (5), (6-1), and (6-2), $X^1$, $X^2$, and $X^3$ each independently represent a single bond or a divalent linking group.

Here, examples of the divalent linking group represented by each of $X^1$, $X^2$ and $X^3$ in Formulae (5), (6-1), and (6-2) include the same ones as those of $X^1$ in Formulae (1), (2-1), and (2-2).

Moreover, in Formulae (5), (6-1), and (6-2), RK represents a cleavage group.

Here, the cleavage group represented by RK in Formulae (5), (6-1), and (6-2) include any one of the above-mentioned cleavage groups (bonds) represented by (bond) in Formulae (rk-1) to (rk-13) in the same manner as RK in Formulae (1), (2-1), and (2-2). Further, in Formulae (rk-1) to (rk-13), *1 represents a binding position to any one of $X^3$ or $X^2$ in Formulae (5), (6-1), and (6-2), *2 represents a binding position to the other of $X^3$ or $X^2$ not bonded to *1 in Formulae (5), (6-1), and (6-2), and R's each independently represent a hydrogen atom or a monovalent organic group.

In addition, in Formulae (5), (6-1), and (6-2), RO represents a photo-alignable group.

Here, examples of the photo-alignable group include the same ones as those of the photo-alignable group represented by RO in Formulae (3), (4-1), and (4-2).

Specific suitable examples of the photo-alignable polymer of the embodiment of the present invention, which satisfies Condition 2, include polymers represented by Formulae H-1 to H-3.

On the other hand, in a case where the photo-alignable polymer of the embodiment of the present invention satisfies Condition 2, from the viewpoint of the liquid crystal alignment properties of the optically anisotropic layer formed on the upper layer, it is preferable that the repeating unit A is a

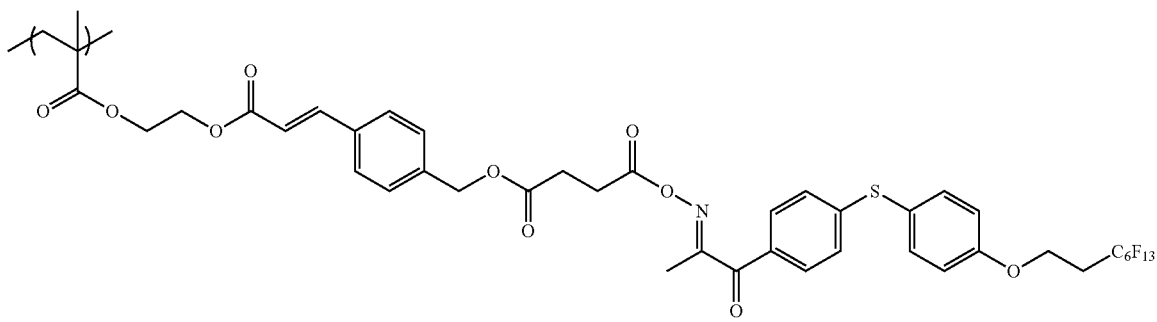

H-1

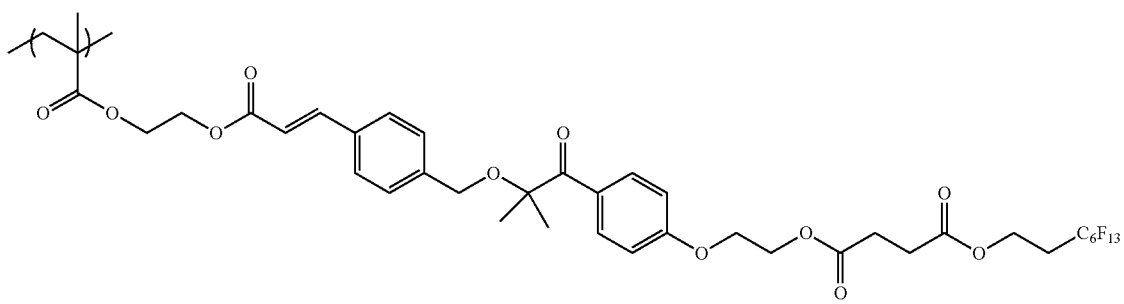

H-2

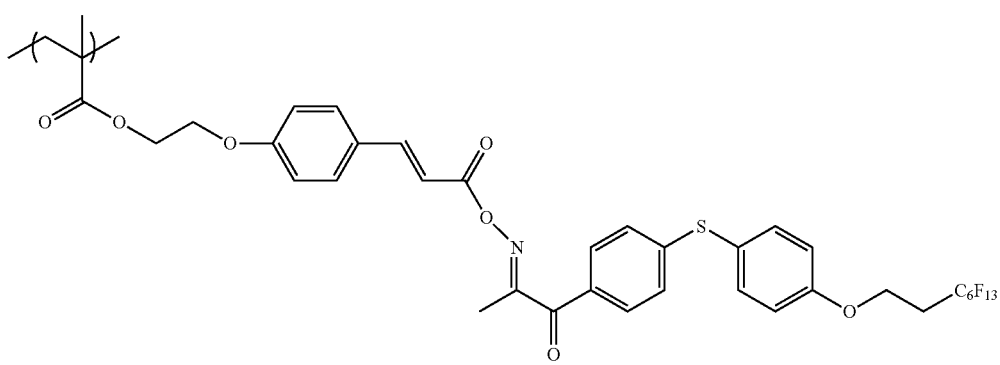

H-3

The weight-average molecular weight (Mw) of the photo-alignable polymer of the embodiment of the present invention is preferably 1,000 to 500,000, more preferably 1,500 to 400,000, and particularly preferably 2,000 to 300,000.

Furthermore, the number-average molecular weight (Mn) of the photo-alignable polymer of the embodiment of the present invention is preferably 500 to 250,000, more preferably 1,000 to 200,000, and particularly preferably 1,500 to 150,000.

Moreover, the dispersity (Mw/Mn) of the photo-alignable polymer of the embodiment of the present invention is preferably 1.00 to 20.00, more preferably 1.00 to 18.00, and particularly preferably 1.00 to 16.00.

In addition, the weight-average molecular weight and the number-average molecular weight are each a value measured under the following conditions by means of gel permeation chromatography (GPC).

[Eluent] Tetrahydrofuran (THF)
[Name of device] Ecosec HLC-8220 GPC (manufactured by Tosoh Corporation)
[Column] TSKgel Super HZM-H, TSKgel Super HZ4000, and TSKgel Super HZM200 (manufactured by Tosoh Corporation)
[Column temperature] 40° C.
[Flow rate] 50 ml/min Binder Composition The binder composition of an embodiment of the present invention is a composition which contains the binder and the photo-alignable polymer of the embodiment of the present invention.

Here, the content of the photo-alignable polymer included in the binder composition of the embodiment of the present invention is preferably 0.1 to 10 parts by mass, and more preferably 0.5 to 5 parts by mass with respect to 100 parts by mass of a binder which will be described later.

Binder

The binder included in the binder composition of the embodiment of the present invention is not particularly limited, and may be itself either a resin that is simply dried and solidified such as a resin that is only composed of a resin having no polymerization reactivity (hereinafter also referred to as a "resin binder") or a polymerizable compound.

<Resin Binder>

Specific examples of the resin binder include an epoxy resin, a diallyl phthalate resin, a silicone resin, a phenol resin, an unsaturated polyester resin, a polyimide resin, a polyurethane resin, a melamine resin, a urea resin, an ionomer resin, an ethylene ethyl acrylate resin, an acrylonitrile-acrylate-styrene copolymer resin, an acrylonitrile-styrene resin, an acrylonitrile-polyethylene chloride-styrene copolymer resin, an ethylene-vinyl acetate resin, an ethylene-vinyl alcohol copolymer resin, an acrylonitrile-butadiene-styrene copolymer resin, a vinyl chloride resin, a chlorinated polyethylene resin, a polyvinylidene chloride resin, a cellulose acetate resin, a fluororesin, a polyoxymethylene resin, a polyamide resin, a polyarylate resin, a thermoplastic polyurethane elastomer, a polyether ester ketone resin, a polyether sulfone resin, polyethylene, polypropylene, a polycarbonate resin, polystyrene, a polystyrene-maleic acid copolymer resin, a polystyrene-acrylic acid copolymer resin, a polyphenylene ether resin, a polyphenylene sulfide resin, a polybutadiene resin, a polybutylene terephthalate resin, an acrylic resin, a methacrylic resin, a methylpentene resin, polylactic acid, a polybutylene succinate resin, a butyral resin, a formal resin, polyvinyl alcohol, polyvinyl pyrrolidone, ethyl cellulose, carboxymethyl cellulose, gelatin, and copolymer resins thereof.

<Polymerizable Compound>

Examples of the polymerizable compound include an epoxy-based monomer, an acrylic monomer, and an oxetanyl-based monomer, and among these, the epoxy-based monomer and the acrylic monomer are preferable.

In addition, in the present invention, a polymerizable liquid crystal compound may be used as the polymerizable compound.

(Epoxy-Based Monomer)

Examples of the epoxy group-containing monomer which is the epoxy-based monomer include a bishenol A type epoxy resin, a bisphenol F type epoxy resin, a brominated bisphenol A type epoxy resin, a bisphenol S type epoxy resin, a diphenyl ether type epoxy resin, a hydroquinone type epoxy resin, a naphthalene type epoxy resin, a biphenyl type epoxy resin, a fluorene type epoxy resin, a phenolnovolak type epoxy resin, an orthocresol novolak type epoxy resin, a trishydroxyphenylmethane type epoxy resin, a trifunctional type epoxy resin, a tetraphenylolethane type epoxy resin, a dicylopentadiene phenol type epoxy resin, a hydrogenated bisphenol A type epoxy resin, a bisphenol A nucleus-containing polyol type epoxy resin, a polypropylene glycol type epoxy resin, a glycidyl ester type epoxy resin, a glycidylamine type epoxy resin, a glyoxal type epoxy resin, an alicyclic type epoxy resin, and a heterocyclic epoxy resin.

(Acrylic Monomer)

Examples of the acrylate monomer and the methacrylate monomer which are each the acrylic monomer include, as a trifunctional monomer, trimethylolpropane triacrylate, trimethylolpropane propylene oxide (PO)-modified triacrylate, trimethylolpropane ethylene oxide (EO)-modified triacrylate, trimethylolpropane trimethacrylate, and pentaerythritol triacrylate. In addition, examples of the acrylate monomer and the methacrylate monomer include, as a tetra- or higher-functional monomer or oligomer, pentaerythritol tetraacrylate, pentaerythritol tetramethacrylate, dipentaerythritol pentaacrylate, dipentaerythritol pentamethacrylate, dipentaerythritol hexaacrylate, and dipentaerythritol hexamethacrylate.

(Polymerizable Liquid Crystal Compound)

The polymerizable liquid crystal compound is not particularly limited, and for example, a compound capable of being aligned in any one alignment of a homeotropic alignment, a homogeneous alignment, a hybrid alignment, or a cholesteric alignment can be used.

Here, generally, the liquid crystal compounds can be classified into a rod type and a disc type based on the shape thereof. Further, each of the rod type and the disc type includes a low molecular weight type and a polymer type. Generally, the polymer refers to a molecule having a degree of polymerization of 100 or more ("Polymer Physics·Dynamics of Phase Transition", Masao Doi, p. 2, Iwanami Shoten, Publishers, 1992). In the present invention, any of the liquid crystal compounds can be used, but it is preferable to use a rod-like liquid crystal compound (hereinafter also abbreviated as "CLC") or a discotic liquid crystal compound (disc-like liquid crystal compound) (hereinafter also abbreviated as "DLC"), and it is also preferable to use a monomer or a liquid crystal compound with a relatively low molecular weight, which has a degree of polymerization of less than 100.

In addition, specific examples of the polymerizable group contained in the polymerizable liquid crystal compound include an acryloyl group, a methacryloyl group, an epoxy group, and a vinyl group.

It is possible to fix the alignment of the liquid crystal compound by the polymerization of such a polymerizable liquid crystal compound. Incidentally, it is not necessary to exhibit liquid crystallinity any longer after the liquid crystal compound is fixed by the polymerization.

As the rod-like liquid crystal compound, for example, the liquid crystal compounds described in claim 1 of JP1999-513019A (JP-H11-513019A) or paragraphs [0026] to [0098] of JP2005-289980A can be preferably used, as the discotic liquid crystal compound, for example, the liquid crystal compounds described in paragraphs [0020] to [0067] of JP2007-108732A and paragraphs [0013] to [0108] of JP2010-244038A can be preferably used, but there is no limitation thereto.

In the present invention, a reciprocal wavelength dispersible liquid crystal compound can be used as the polymerizable liquid crystal compound.

Here, in the present specification, the liquid crystal compound having "reciprocal wavelength dispersibility" means that a Re value becomes equal or higher as a measurement wavelength is increased in a case where an in-plane retardation (Re) value at a specific wavelength (visible light range) is measured of a phase difference film thus prepared.

The reciprocal wavelength dispersible liquid crystal compound is not particularly limited as long as it can form a reciprocal wavelength dispersible film as described above, and for example, the compound represented by General Formula (I) described in JP2008-297210A (in particular, the compounds described in paragraph Nos. [0034] to [0039]), the compound represented by General Formula (I) described in JP2010-084032A (in particular, the compounds described in paragraph Nos. [0067] to [0073]), the compound represented by General Formula (I) described in JP2016-081035A (in particular, the compounds described in paragraph Nos. [0043] to [0055]), or the like can be used.

In addition, the compounds described in paragraph Nos. [0027] to [0100] of JP2011-006360A, paragraph Nos. [0028] to [0125] of JP2011-006361A, paragraph Nos. [0034] to [0298] of JP2012-207765A, paragraph Nos. [0016] to [0345] of JP2012-077055A, paragraph Nos. [0017] to [0072] of WO12/141245A, paragraph Nos. [0021]

to [0088] of WO12/147904A, or paragraph Nos. [0028] to [0115] of WO14/147904A can be used.

Polymerization Initiator

In a case where a polymerizable compound is used as a binder, it is preferable that the binder composition of the embodiment of the present invention contains a polymerization initiator.

Such a polymerization initiator is not particularly limited, but depending on the type of the polymerization reaction, examples of the polymerization initiator include a thermal polymerization initiator and a photopolymerization initiator.

In the present invention, a photopolymerization initiator capable of initiating a polymerization reaction by irradiation with ultraviolet rays is preferable.

Examples of the photopolymerization initiator include α-carbonyl compounds (described in each of the specifications of U.S. Pat. Nos. 2,367,661A and 2,367,670A), acyloin ethers (described in U.S. Pat. No. 2,448,828A), aromatic acyloin compounds substituted by α-hydrocarbon (described in U.S. Pat. No. 2,722,512A), polynuclear quinone compounds (described in each of the specifications of U.S. Pat. Nos. 3,046,127A and 2,951,758A), combinations of triarylimidazole dimers and p-aminophenyl ketones (described in U.S. Pat. No. 3,549,367A), acridine and phenazine compounds (described in JP1985-105667A (JP-S60-105667A) and U.S. Pat. No. 4,239,850A), oxadiazole compounds (described in U.S. Pat. No. 4,212,970A), and acylphosphine oxide compounds (described in JP1988-040799B (JP-S63-040799B), JP1993-029234B (JP-H05-029234B), JP1998-095788A (JP-H10-095788A), and JP1998-029997A (JP-H10-029997A)).

Photoacid Generator

In a case where the above-mentioned photo-alignable polymer is a polymer having a monovalent specific group including a cleavage group capable of decomposing by an action of an acid to generate a polar group, it is preferable that the binder composition of the embodiment of the present invention contains a photoacid generator.

The photoacid generator is preferably a compound which responds to actinic rays at a wavelength of 300 nm or more and preferably at a wavelength of 300 to 450 nm to generate an acid, but there is no limitation in the chemical structure thereof. In addition, with regard to a photoacid generator which does not directly respond to actinic rays at a wavelength of 300 nm or more, any of compounds which respond to actinic rays at a wavelength of 300 nm or more to generate an acid as used in combination with a sensitizer can be preferably used in combination with the sensitizer. As the photoacid generator used in the present invention, a photoacid generator capable of generating an acid having a pKa of 4 or less is preferable, a photoacid generator capable of generating an acid having a pKa of 3 or less is more preferable, and a photoacid generator capable of generating an acid having a pKa of 2 or less is the most preferable. In the present invention, the pKa basically refers to a pKa in water at 25° C. In a case where the pKa cannot be measured in water, the pKa refers to a value obtained by measuring the pKa by chaining the water to a solvent suitable for measurement. Specifically, reference can be made to the pKa described in Handbook of Chemistry or the like. As the acid having a pKa of 3 or less, sulfonic acid or phosphonic acid is preferable, and the sulfonic acid is more preferable.

Examples of the photoacid generator include an onium salt compound, trichloromethyl-s-triazines, a sulfonium salt, an iodonium salt, quaternary ammonium salts, a diazomethane compound, an imide sulfonate compound, and an oxime sulfonate compound. Among these, the onium salt compound, the imide sulfonate compound, or the oxime sulfonate compound is preferable, and the onium salt compound or the oxime sulfonate compounds is particularly preferable. The photoacid generator may be used singly or in combination of two or more kinds thereof.

Solvent

It is preferable that the binder composition of the embodiment of the present invention contains a solvent from the viewpoint of workability for forming a binder layer.

Specific examples of the solvent include ketones (for example, acetone, 2-butanone, methyl isobutyl ketone, and cyclohexanone), ethers (for example, dioxane and tetrahydrofuran), aliphatic hydrocarbons (for example, hexane), alicyclic hydrocarbons (for example, cyclohexane), aromatic hydrocarbons (for example, toluene, xylene, and trimethylbenzene), halogenated carbons (for example, dichloromethane, dichloroethane, dichlorobenzene, and chlorotoluene), esters (for example, methyl acetate, ethyl acetate, and butyl acetate), water, alcohols (for example, ethanol, isopropanol, butanol, and cyclohexanol), cellosolves (for example, methyl cellosolve and ethyl cellosolve), cellosolve acetates, sulfoxides (for example, dimethyl sulfoxide), and amides (for example, dimethylformamide and dimethylacetamide), and these may be used singly or in combination of two or more kinds thereof.

Binder Layer

The binder layer of an embodiment of the present invention is a layer formed using the above-mentioned binder composition of the embodiment of the present invention.

A method forming the binder layer varies depending on the kind of the binder, and is thus not particularly limited, but in a case where a polymerizable compound is used as the binder, the binder layer can be formed by a method known in the related art such as photocation polymerization and radical polymerization.

Optical Laminate

The optical laminate of an embodiment of the present invention is an optical laminate having the binder layer of the embodiment of the present invention and an optically anisotropic layer provided on the binder layer.

In the optical laminate of the embodiment of the present invention, the optically anisotropic layer provided on the binder layer is formed using a polymerizable liquid crystal composition containing a polymerizable liquid crystal compound, and the binder layer and the optically anisotropic layer are laminated in adjacent to each other.

In addition, the optical laminate of the embodiment of the present invention preferably has a support that supports the binder layer.

Hereinafter, suitable aspects of the optical laminate of the embodiment of the present invention will be described in detail.

Support

Examples of the support include a glass substrate and a polymer film.

Examples a material for the polymer film include cellulose-based polymers; acrylic polymers having an acrylic acid ester polymer such as polymethyl methacrylate and a lactone ring-containing polymer; thermoplastic norbornene-based polymers; polycarbonate-based polymers; polyester-based polymers such as polyethylene terephthalate and polyethylene naphthalate; styrene-based polymers such as polystyrene and an acrylonitrile-styrene copolymer (AS resin); polyolefin-based polymers such as polyethylene, polypropylene, and an ethylene-propylene copolymer; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers containing a mixture of these polymers.

The thickness of the support is not particularly limited, but is preferably 5 to 200 µm, more preferably 10 to 100 µm, and still more preferably 20 to 90 µm.

Binder Layer

The binder layer is the above-mentioned binder layer of the embodiment of the present invention.

In the present invention, the thickness of the binder layer is not particularly limited, but is preferably 0.1 to 10 µm, and more preferably 0.5 to 5 µm.

Optically Anisotropic Layer

The optically anisotropic layer is formed using the polymerizable liquid crystal composition containing a polymerizable liquid crystal compound as described above.

Here, examples of the polymerizable liquid crystal composition for forming an optically anisotropic layer include a composition formed by blending the polymerizable liquid crystal compound, the polymerization initiator, the solvent, and the like, as described above as optional components in the binder composition of the embodiment of the present invention.

In the present invention, the thickness of the optically anisotropic layer is not particularly limited, but is preferably 0.1 to 10 µm, and more preferably 0.5 to 5 µm.

Method for Producing Optical Laminate

The method for producing an optical laminate of an embodiment of the present invention is a method for preparing a suitable aspect of the above-mentioned optical laminate of the embodiment of the present invention, which includes a first applying step of applying the above-mentioned binder composition of the embodiment of the present invention onto the above-mentioned support; a binder layer forming step of forming a binder layer after the first applying step; an action performing step of performing an action of at least one selected from the group consisting of light, heat, an acid, and a base; a light irradiating step of irradiating polarized light or unpolarized light; a second applying step of directly applying a polymerizable liquid crystal composition for forming an optically anisotropic layer onto the binder layer; and an optically anisotropic layer forming step of forming an optically anisotropic layer after the second applying step.

Furthermore, in the method for producing an optical laminate of the embodiment of the present invention, the action performing step is a step performed between the binder layer forming step and the second applying step or performed at the same time with the binder layer forming step or the second applying step.

In addition, in the method for producing an optical laminate of the embodiment of the present invention, the light irradiating step is a step performed between the binder layer forming step and the second applying step or performed at the same time with the binder layer forming step or the second applying step.

First Applying Step

The first applying step is a step of applying the above-mentioned binder composition of the embodiment of the present invention onto the above-mentioned support.

A method for applying the binder composition of the embodiment of the present invention is not particularly limited, and specific examples of the applying method include a spin coating method, an air knife coating method, a curtain coating method, a roller coating method, a wire bar coating method, a gravure coating method, and a die coating method.

Binder Layer Forming Step

The binder layer forming step is a step of forming a binder layer after the first applying step, and the binder layer can be formed by subjecting a coating film obtained in the first applying step to a curing treatment (irradiation with ultraviolet rays (light irradiating treatment) or a heating treatment).

In addition, the conditions for the curing treatment are not particularly limited, but in the polymerization by irradiation with light, ultraviolet rays are preferably used. The irradiation dose is preferably 10 mJ/cm$^2$ to 50 J/cm$^2$, more preferably 20 mJ/cm$^2$ to 5 J/cm$^2$, still more preferably 30 mJ/cm$^2$ to 3 J/cm$^2$, and particularly preferably 50 to 1,000 mJ/cm$^2$. In addition, in order to promote a polymerization reaction, the polymerization may be performed under heating conditions.

Action Performing Step

The action performing step is a step of performing an action of at least one selected from the group consisting of light, heat, an acid, and a base.

Furthermore, the action performing step is a step performed between the binder layer forming step and the second applying step or performed at the same time with the binder layer forming step or the second applying step from the viewpoint of securing the coating properties in a case of forming an optically anisotropic layer as an upper layer.

Here, the expression "between the binder layer forming step and the second applying step" refers to performing an action performing step (for example, a step of performing an action of light) before subjecting a binder layer formed in the binder layer forming step (for example, thermal polymerization) to the second applying step.

Moreover, the expression "at the same time with the binder layer forming step" refers to performing the step of forming a binder layer, for example, a step of forming a binder layer by polymerization of olefin-based monomers through generation of photoradicals, polymerization of epoxy monomers through generation of a photoacid, or the like at the same time with the action performing step (for example, a step of performing an action of light). That is, it means that the light used for the polymerization of the binder layer and the light used for the cleavage cause two actions at the same time.

In addition, the expression "at the same time with the second applying step" refers to performing the action performing step (for example, a step of performing an action of heat) at the same time as a binder layer formed in the binder layer forming step (for example, photopolymerization) is subjected to the second applying step.

Among those, it is preferable to perform an action of light and thus, perform the second applying step at the same time with the binder layer forming step from the viewpoint of simplification of a process.

Incidentally, examples of a method for performing an action of light include a method in which the binder layer is irradiated with ultraviolet rays. It is possible to use an ultraviolet ray-emitting lamp such as a high-pressure mercury lamp and a metal halide lamp, or the like as a light source. In addition, the irradiation dose is preferably 10 $mJ/cm^2$ to 50 $J/cm^2$, more preferably 20 $mJ/cm^2$ to 5 $J/cm^2$, still more preferably 30 $mJ/cm^2$ to 3 $J/cm^2$, and particularly preferably 50 to 1,000 $mJ/cm^2$.

Furthermore, examples of a method for performing an action of heat include a method in which the binder layer is heated. A heating temperature is preferably 50° C. to 200° C., more preferably 60° C. to 150° C., and particularly preferably 70° C. to 130° C.

Moreover, examples of a method for performing an action of an acid include a method in which an acid is added to the binder layer in advance, a method in which a photoacid generator is added to the binder layer and an acid is generated using light as a trigger, and a method in which a thermal acid generator is added to the binder layer, and an acid is generated using heat as a trigger. Among these, the methods using the photoacid generator and the thermal acid generator are preferable.

In addition, examples of a method for performing an action of a base include a method in include a method in which a base is added to the binder layer in advance, a method in which a photobase generator is added to the binder layer and a base is generated using light as a trigger, and a method in which a thermal base generator is added to the binder layer, and a base is generated using heat as a trigger. Among these, the methods using the photobase generator and the thermal base generator are preferable.

Irradiating Step

The irradiating step is a step of performing irradiation with polarized light or unpolarized light, that is, a step of imparting an alignment function.

Furthermore, the irradiating step is a step performed between the binder layer forming step and the second applying step or performed at the same time with the binder layer forming step or the second applying step, from the viewpoint of securing coating properties in a case of forming an optically anisotropic layer as an upper layer.

Here, the expression "between the binder layer forming step and the second applying step" refers to performing an irradiating step (for example, a step of performing irradiation with polarized light) before subjecting a binder layer formed in the binder layer forming step (for example, thermal polymerization) to the second applying step.

Moreover, the expression "at the same time with the binder layer forming step" refers to performing the step of forming a binder layer, for example, a step of forming a binder layer by polymerization of olefin-based monomers through generation of photoradicals, polymerization of epoxy monomers through generation of a photoacid and the irradiating step (for example, a step of performing irradiation with polarized light) at the same time. That is, it means that the light used for the polymerization of the binder layer and the light used for the alignment cause two actions at the same time.

In addition, the expression "at the same time with the second applying step" refers to performing the irradiating step (for example, a step of performing irradiation with polarized light) at the same time at a time of subjecting a binder layer formed in the binder layer forming step (for example, photopolymerization) to the second applying step.

Among those, the step performed between the binder layer forming step and the second applying step is preferable.

Preferred examples of the irradiating method include a method of performing irradiation with polarized ultraviolet rays, and specifically, a method using a polarizing plate (for example, an iodine polarizing plate, a dichroic dye polarizing plate, and a wire grid polarizing plate); a method using a prism-based element (for example, a GLAN-THOMSON prism) or a reflective type polarizer using a BREWSTER angle; and a method using light emitted from a laser light source with polarized light.

The light source used for irradiation with ultraviolet rays is not particularly limited as long as it is a light source generating ultraviolet rays, and examples thereof include lamps such as low-pressure mercury lamp, a medium-pressure mercury lamp, a high-pressure mercury lamp, an ultrahigh-pressure mercury lamp, a carbon arc lamp, a metal halide lamp, a xenon lamp, or the like can be used.

Second Applying Step

The second applying step is a step of directly applying a polymerizable liquid crystal composition for forming an optically anisotropic layer onto the binder layer. A method for applying the polymerizable liquid crystal composition for forming an optically anisotropic layer is not particularly limited, and examples thereof include the same method as in the first applying step.

Optically Anisotropic Layer Forming Step

The optically anisotropic layer forming step is a step of forming an optically anisotropic layer after the second applying step, and the optically anisotropic layer can be formed by subjecting a coating film obtained in the second applying step to a curing treatment (irradiation with ultraviolet rays (light irradiating treatment) or a heating treatment).

In addition, the conditions for the curing treatment are not particularly limited, but it is preferable to use ultraviolet rays in polymerization by irradiation with light. The irradiation dose is preferably 10 $mJ/cm^2$ to 50 $J/cm^2$, more preferably 20 $mJ/cm^2$ to 5 $J/cm^2$, still more preferably 30 $mJ/cm^2$ to 3 $J/cm^2$, and particularly preferably 50 to 1,000 $mJ/cm^2$. Further, in order to promote the polymerization reaction, the polymerization may be performed under heating conditions.

Image Display Device

The image display device of an embodiment of the present invention is an image display device having the optically anisotropic layer of the present invention or the optical laminate of the embodiment of the present invention.

The display element used in the image display device of the embodiment of the present invention is not particularly limited, and examples thereof include a liquid crystal cell, an organic electroluminescence (hereinafter abbreviated as "EL") display panel, and a plasma display panel.

Among those, the liquid crystal cell or the organic EL display panel is preferable, and the liquid crystal cell is more preferable. That is, as the image display device of the embodiment of the present invention, a liquid crystal display device using a liquid crystal cell as a display element or an organic EL display device using an organic EL display panel as a display element is preferable.

Liquid Crystal Display Device

The liquid crystal display device as an example of the image display device of the embodiment of the present invention is a liquid crystal display device having the above-mentioned optically anisotropic layer of the embodiment of the present invention or the optical laminate of the embodiment of the present invention, and a liquid crystal cell.

Hereinafter, the liquid crystal cell constituting the liquid crystal display device will be described in detail.

<Liquid Crystal Cell>

The liquid crystal cell which is used in the liquid crystal display device is preferably of a vertical alignment (VA) mode, an optically compensated bend (OCB) mode, an in-plane-switching (IPS) mode, or a twisted nematic (TN) mode but there is no limitation thereto.

In a TN mode liquid crystal cell, rod-like liquid crystalline molecules (rod-like liquid crystal compounds) are aligned substantially horizontally in a case in which no voltage is applied and are further aligned in a twisted manner in a range of 60° to 120°. The TN mode liquid crystal cell is most often used in a color TFT liquid crystal display device and is described in many literatures.

In a VA mode liquid crystal cell, rod-like liquid crystalline molecules are aligned substantially vertically in a case in which no voltage is applied. Examples of the VA mode liquid crystal cells include (1) a narrowly defined VA mode liquid crystal cell (described in JP1990-176625A (JP-H02-176625A)) in which rod-like liquid crystalline molecules are aligned substantially vertically in a case in which no voltage is applied and are aligned substantially horizontally in a case in which a voltage is applied, (2) a multi-domain VA mode (multi-domain vertical alignment (MVA) mode) liquid crystal cell for enlarging the viewing angle (SID97, Digest of Tech. Papers (Proceedings) 28 (1997) 845), (3) a liquid crystal cell in a mode (axially symmetric aligned microcell (n-ASM mode)) in which rod-like liquid crystalline molecules are aligned substantially vertically in a case in which no voltage is applied and are aligned in twisted multi-domain alignment in a case in which a voltage is applied (Proceedings of Japanese Liquid Crystal Conference, 58 and 59 (1998)), and (4) a super ranged viewing by vertical alignment (SURVIVAL) mode liquid crystal cell (presented in liquid crystal display (LCD) International 98). In addition, the liquid crystal cell may be of any of a patterned vertical alignment (PVA) type, an optical alignment type, and a polymer-sustained alignment (PSA) type. Details of these modes are described in JP2006-215326A and JP2008-538819A.

In an IPS mode liquid crystal cell, rod-like liquid crystalline molecules are aligned substantially parallel with respect to a substrate and application of an electric field parallel to the substrate surface causes the liquid crystal molecules to respond planarly. The IPS mode displays black in a case in which no electric field is applied and a pair of upper and lower polarizing plates have absorption axes which are orthogonal to each other. A method of improving the viewing angle by reducing light leakage during black display in an oblique direction using an optical compensation sheet is described in JP1998-054982A (JP-H10-054982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

Organic EL Display Device

Suitable examples of the organic EL display device which is one example of the image display device of the embodiment of the present invention include an aspect of an organic EL display panel which has a polarizer, the optically anisotropic layer of the present invention or the optical laminate of the embodiment of the present invention, and an organic EL display in this order from the viewing side.

<Polarizer>

The polarizer is not particularly limited as long as it is a member having a function of converting light into specific linearly polarized light, and an absorptive type polarizer and a reflective type polarizer, which are known in the related art, can be used.

An iodine-based polarizer, a dye-based polarizer using a dichroic dye, a polyene-based polarizer, or the like is used as the absorptive type polarizer. As the iodine-based polarizer and the dye-based polarizer, there are a coating type polarizer and a stretching type polarizer, both of which can be applied.

In addition, examples of a method for obtaining a polarizer by performing stretching and dyeing in a state of a laminated film in which a polyvinyl alcohol layer is formed on a base material include the methods disclosed in JP5048120B, JP5143918B, JP4691205B, JP4751481B, and JP4751486B, and known technologies related to these polarizers can also be preferably used.

A polarizer in which thin films having different birefringence are laminated, a wire grid type polarizer, a polarizer in which a cholesteric liquid crystal having a selective reflection range and a ¼ wavelength plate are combined, or the like is used as the reflective type polarizer.

Among these, from the viewpoint that the adhesiveness is more excellent, a polarizer including a polyvinyl alcohol-based resin (a polymer including —$CH_2$—CHOH— as a repeating unit, in particular, at least one selected from the group consisting of polyvinyl alcohol and an ethylene-vinyl alcohol copolymer) is preferable.

The thickness of the polarizer is not particularly limited, but is preferably 3 μm to 60 μm, more preferably 5 μm to 30 μm, and still more preferably 5 μm to 15 μm.

<Organic EL Display Panel>

The organic EL display panel is a member which forms a light emitting layer or a plurality of organic compound thin films including the light emitting layer between a pair of electrodes, that is, an anode and a cathode, and may have, in addition to the light emitting layer, a hole injecting layer, a hole transporting layer, an electron injecting layer, an electron transporting layer, a protective layer, or the like, and each of these layers may comprise different functions. Each of various materials can be used to form each of the layers.

EXAMPLES

Hereinafter, the present invention will be described in more detail with reference to Examples. The materials, the amounts to materials used, the ratios, the treatment details, the treatment procedure, or the like shown in the following Examples can be modified as appropriate while not departing from the spirit of the present invention. Therefore, the scope of the present invention will not be restrictively interpreted by the following Examples.

Photo-Alignable Polymer KH1

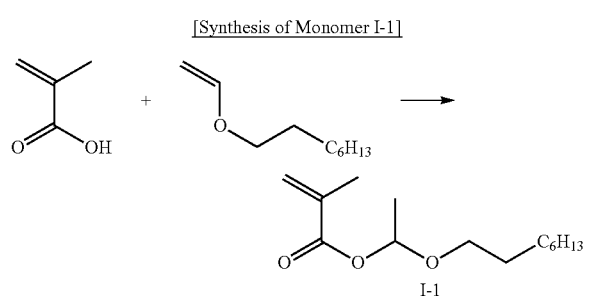

[Synthesis of Monomer I-1]

As shown in the scheme, 4.9 g (56.5 mmol) of methacrylic acid, 14.3 g of toluene, and 10.0 mg of dibutylhydroxytoluene (BHT) were introduced into a 200-ml three-neck flask equipped with a stirrer, a thermometer, and a reflux condenser, and the mixture was stirred at room temperature (23° C.) for homogenization.

Subsequently, 3.6 mg (0.02 mmol) of 10-camphorsulfonic acid was added thereto at room temperature and the mixture was stirred. 20.02 g (51.3 mmol) of 2-(perfluorohexyl) ethylvinyl ether was added dropwise thereto for 1.5 hours and the mixture was stirred at room temperature for 3 hours. 200 mL of ethyl acetate and 200 mL of aqueous sodium bicarbonate were added to the obtained solution to perform liquid separation purification, and the organic layer was extracted. Magnesium sulfate was added thereto, the mixture was dried and filtered, and then the solvent was evaporated to obtain 23.2 g of a monomer I-1.

The structure was identified by a $^1$H-nuclear magnetic resonance (NMR) spectrum of the obtained monomer I-1.

$^1$H-NMR (CDCl$_3$) δ(ppm): 1.45 (d, 3H), 1.95 (s, 3H), 2.43 (m, 2H), 3.83 to 3.99 (m, 2H), 5.63 (s, 1H), 6.00 (m, 1H), 6.17 (s, 1H)

[Synthesis of Monomer II-1]

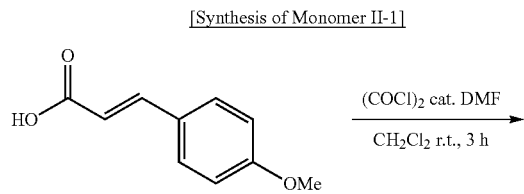

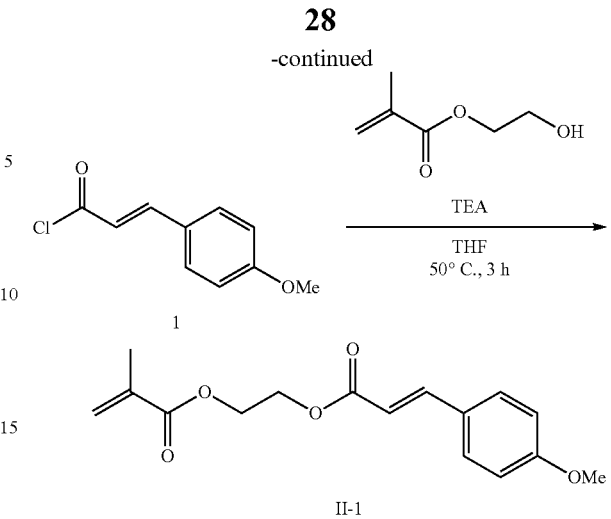

<Synthesis of Intermediate 1>

As shown in the scheme, 200 g of 4-methoxycinnamic acid, 800 mL of dichloromethane, and 5 droplets of dimethylformamide (DMF) were mixed in a 2-L three-neck flask and cooled to an internal temperature of 5° C. Subsequently, 170.9 g of oxalyl chloride was added thereto at an internal temperature kept at 10° C. or lower. After completion of the dropwise addition, the water bath was removed, the temperature was raised to room temperature, and then the mixture was stirred at room temperature for 3 hours. Thereafter, the solvent was evaporated to obtain 220.7 g (a yield of 100%) of an intermediate 1 (4-methoxycinnamic acid chloride).

<Synthesis of Monomer II-1>

As shown in the scheme, 161.8 g of 2-hydroxyethyl methacrylate, 249.9 g of triethylamine (TEA), and 1 L of tetrahydrofuran (THF) were mixed in a 3-L 3-neck flask and cooled to an internal temperature of 5° C. A solution of 200 mL of tetrahydrofuran of the intermediate 1 (220.7 g) was added dropwise thereto at an internal temperature kept at 15° C. or lower. Further, the mixture was stirred at an internal temperature of 50° C. to 55° C. for 3 hours. After cooling the reaction solution to room temperature, 1.2 L of ethyl acetate and 1.2 L of water were added thereto, and the organic phase was subjected to liquid separation and washed with 1 L of 1 N hydrochloric acid, 1 L of saturated aqueous sodium bicarbonate, and 1 L of water in this order. The organic phase was dried over magnesium sulfate to evaporate the solvent. The concentrate was purified by column chromatography to obtain 244.0 g (a yield of 75%) of a monomer II-1.

Synthesis of Photo-Alignable Polymer KH1

5.16 g of methyl ethyl ketone was introduced into a 100-mL 3-neck flask comprising a stirrer, a thermometer, a reflux condenser, and a nitrogen gas inlet, and warmed to 80° C. Subsequently, a mixed solution including 4.13 g (8.7 mmol) of the monomer I-1, 6.19 g (21.3 mmol) of the monomer II-1, 5.16 g of methyl ethyl ketone, and 13.8 mg of "V-601" (manufactured by Wako Pure Chemical Industries, Ltd.) was added dropwise thereto over 180 minutes at a constant rate until the dropwise addition was completed. After completion of the dropwise addition, the mixture was further stirred for 3 hours and then left to be cooled to room temperature, and 25 g of methyl ethyl ketone was added thereto. This solution was purified by reprecipitation with 500 ml of hexane and dried in vacuo at 40° C. for 8 hours to obtain 8.1 g of a white solid of a photo-alignable polymer KH1 represented by the following formula. The weight-average molecular weight (Mw) of the photo-alignable polymer KH1 was 211,000.

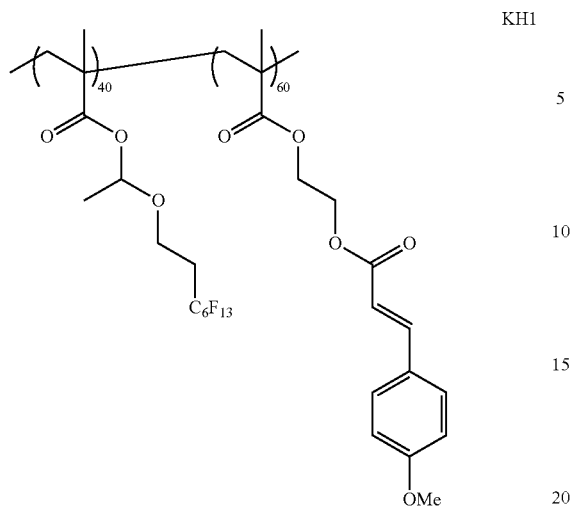

KH1

Photo-Alignable Polymer KH2

A photo-alignable polymer KH2 represented by Formula KH2 was synthesized according to the following scheme. The weight-average molecular weight (Mw) of the synthesized photo-alignable polymer KH2 was 39,600.

In addition, in the following scheme, "V-601" represents dimethyl 2,2'-azobis(2-methylpropionate) (manufactured by Wako Pure Chemical Industries, Ltd.).

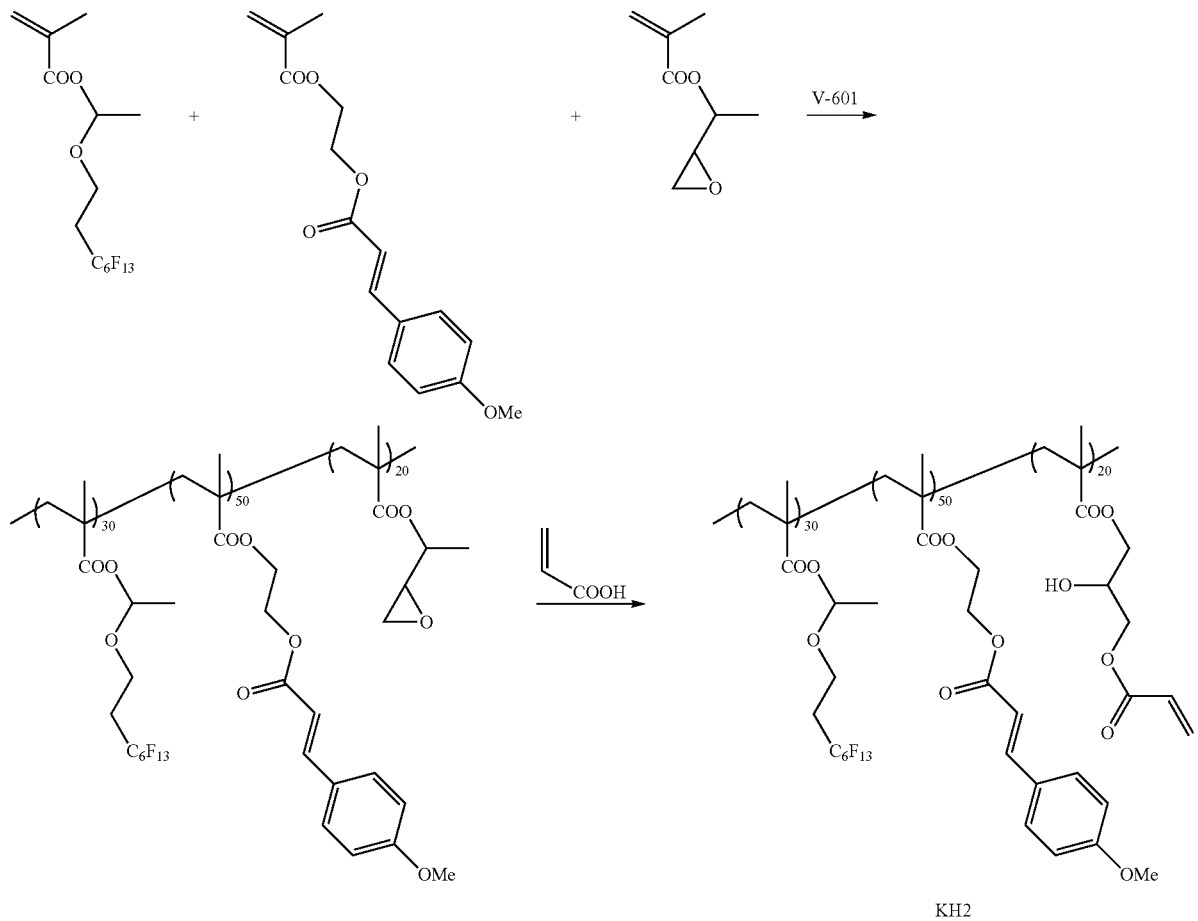

KH2

Photo-Alignable Polymer KH3

[Synthesis of Monomer 11-3]
A monomer II-3 represented by Formula II-3 was synthesized according to the following scheme.

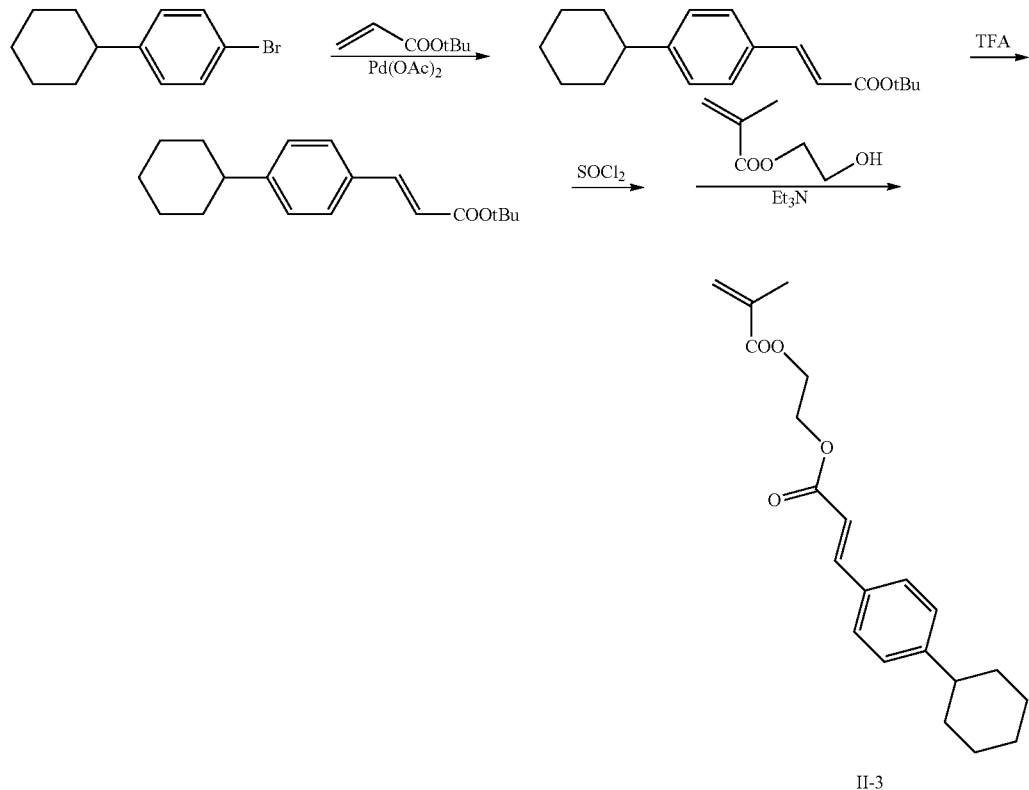

II-3

A photo-alignable polymer KH3 represented by Formula KH3 was synthesized according to the following scheme. The weight-average molecular weight (Mw) of the synthesized photo-alignable polymer KH3 was 52,500.

In addition, in the following scheme, "MOI" represents 2-isocyanatoethyl methacrylate (Karenz MOI (registered trademark), manufactured by Showa Denko K. K.).

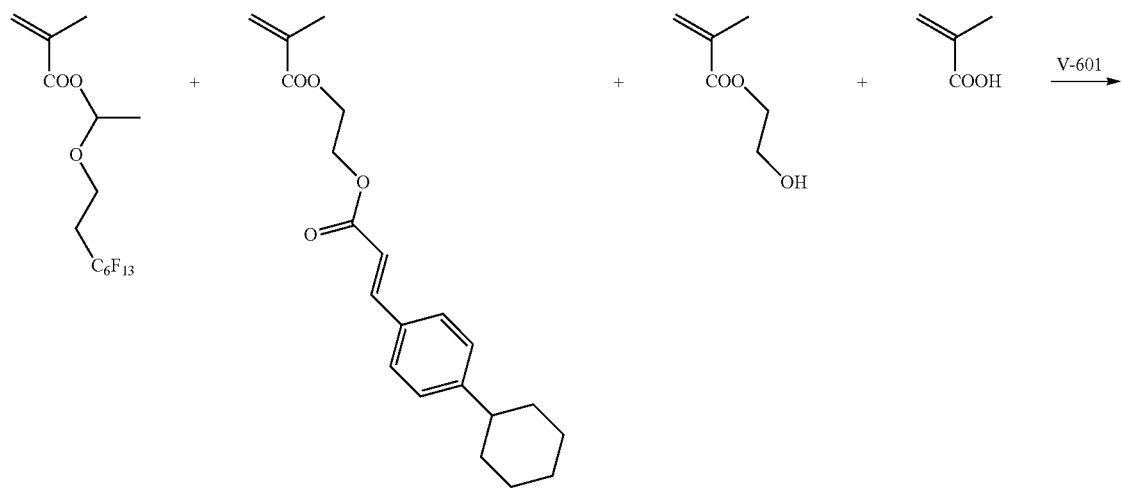

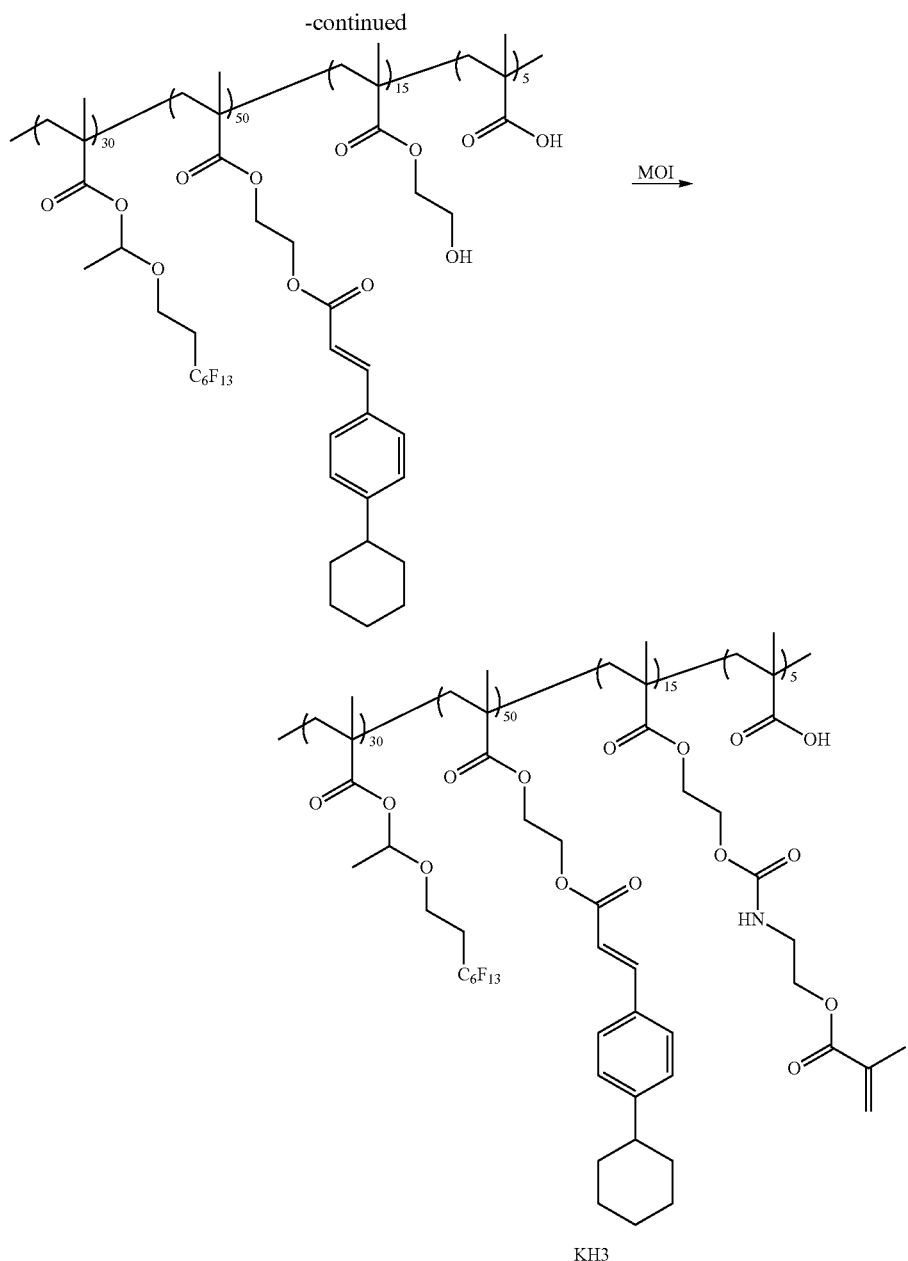
Photo-Alignable Polymer KH4
[Synthesis of Monomer I-5]
A monomer I-5 represented by Formula I-5 was synthesized according to the following scheme.
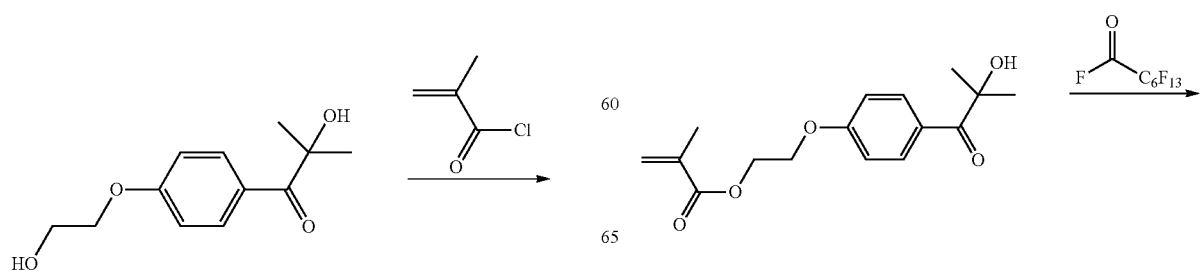

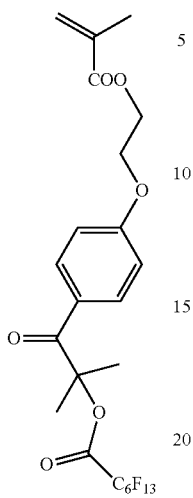
I-5
A photo-alignable polymer KH4 represented by Formula KH4 was synthesized according to the following scheme. The weight-average molecular weight (Mw) of the synthesized photo-alienable polymer KH4 was 66,600.
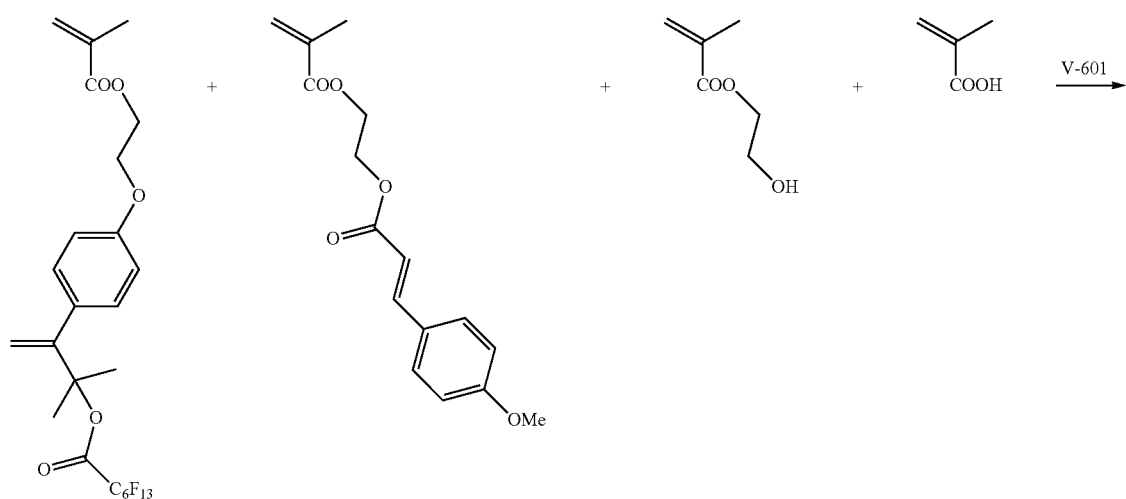

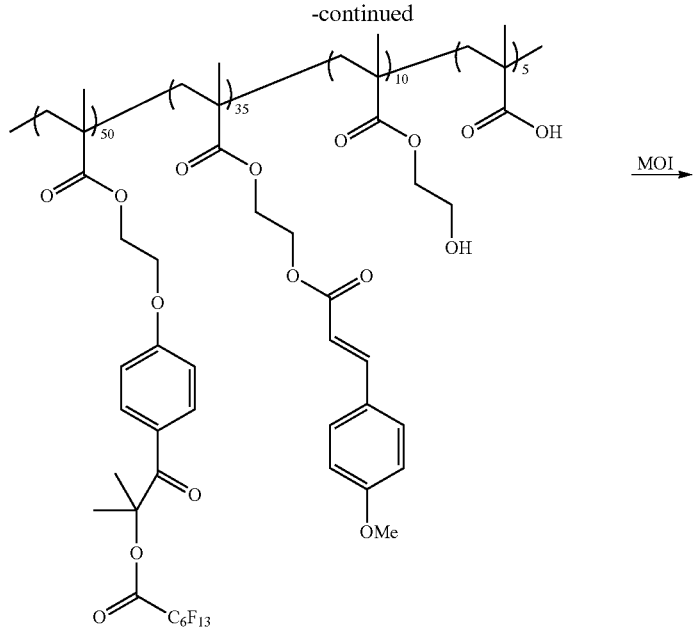
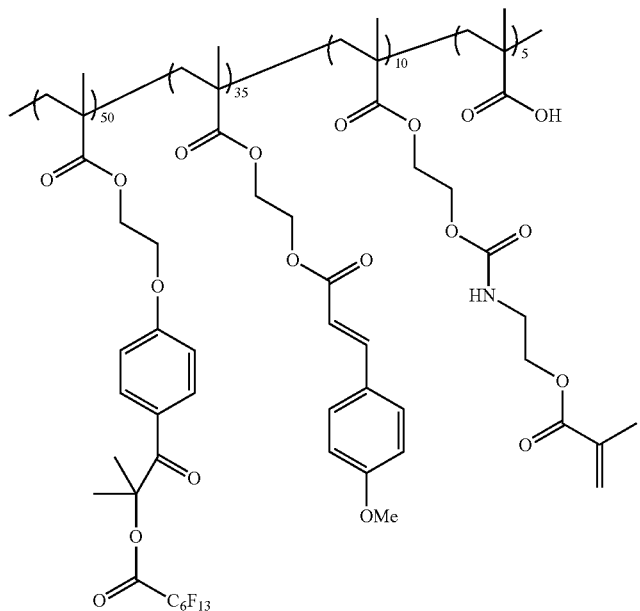
KH4
Photo-Alignable Polymer KH5
[Synthesis of Monomer I-6]
A monomer I-6 represented by Formula I-6 was synthesized according to the following scheme.
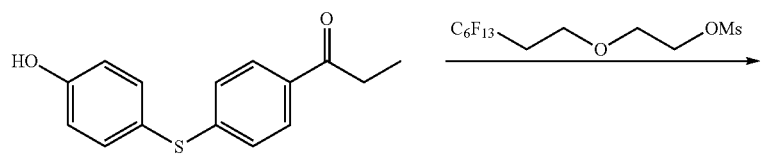

-continued
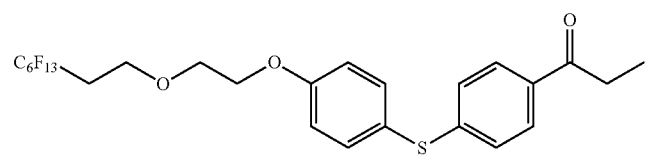 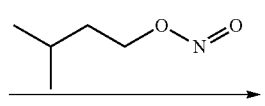
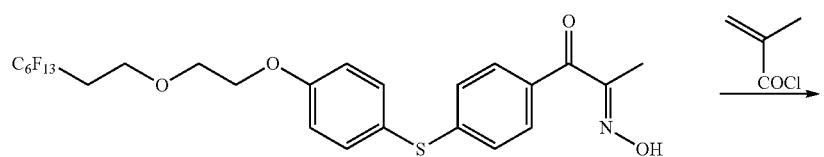
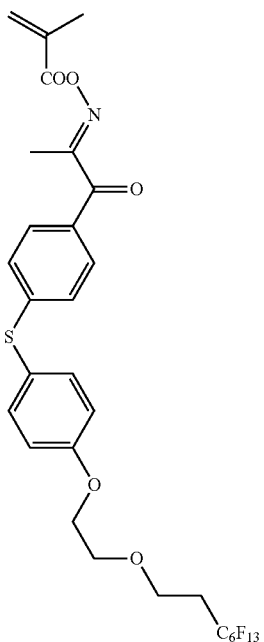
I-6

A photo-alignable polymer KH5 represented by Formula KH5 was synthesized according to the following scheme. The weight-average molecular weight (Mw) of the synthesized photo-alignable polymer KH5 was 51,400.

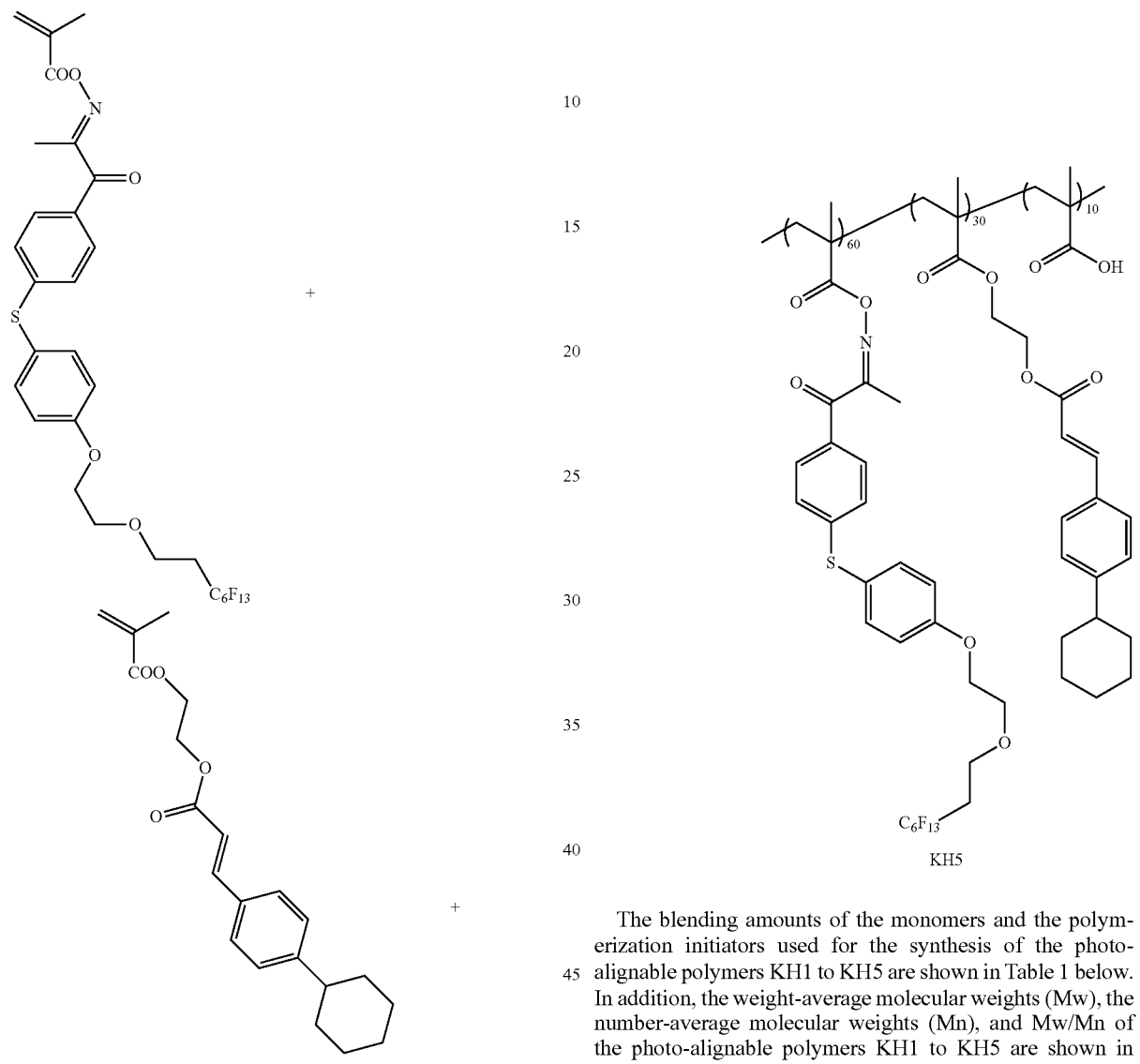

KH5

The blending amounts of the monomers and the polymerization initiators used for the synthesis of the photo-alignable polymers KH1 to KH5 are shown in Table 1 below. In addition, the weight-average molecular weights (Mw), the number-average molecular weights (Mn), and Mw/Mn of the photo-alignable polymers KH1 to KH5 are shown in Table 1 below.

TABLE 1

| | Repeating unit A | | Repeating unit B | | Other repeating units | Polymerization initiator | | Molecular weight | | |
|---|---|---|---|---|---|---|---|---|---|---|
| | Monomer | Parts by mass | Monomer | Parts by mass | Parts by mass | Type | Amount* [eq. (mol)] | Mw | Mn | Mw/Mn |
| KH1 | I-1 | 40 | II-1 | 60 | 0 | V-601 | 0.2 | 211,000 | 53,300 | 3.96 |
| KH2 | I-1 | 30 | II-1 | 50 | 20 | V-601 | 2.1 | 396,00 | 13,400 | 2.96 |
| KH3 | I-1 | 30 | II-3 | 50 | 20 | V-601 | 1.6 | 52,500 | 14,300 | 3.67 |
| KH4 | I-5 | 50 | II-1 | 35 | 15 | V-601 | 0.8 | 66,600 | 21,300 | 3.13 |
| KH5 | I-6 | 60 | II-3 | 30 | 10 | V-601 | 1.2 | 54,100 | 19,800 | 2.73 |

*Equivalent amounts to the monomer

Example 1

[Preparation of Binder Layer]

An epoxy monomer (CEL2021P; manufactured by Daicel Corporation) (100 parts by mass), the following photoacid generator (B-1-1) (5.0 parts by mass), and a photo-alignable polymer KH1 (2.0 parts by mass) were dissolved in methyl ethyl ketone (300 parts by mass) to prepare a solution for forming a binder layer. The prepared solution for forming a binder layer was spin-coated onto a glass substrate which had been washed, and irradiated with ultraviolet rays at an irradiation dose of 500 mJ/cm$^2$ using an ultraviolet (UV)-light emitting diode (LED) at 365 nm at room temperature. Thereafter, the film was annealed at 80° C. for 1 minute, and further at 120° C. for 1 minute to prepare a binder layer. The film thickness was about 3 μm. In addition, the surface energy of the binder layer was 50 mN/m.

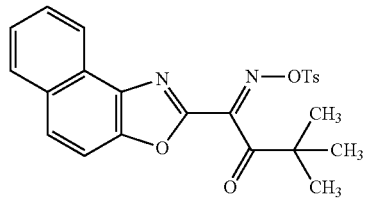

B-1-1

[Irradiating Step (to Impart Alignment Function)]

The obtained binder layer was imparted with an alignment function by performing irradiation with UV light (ultra-high pressure mercury lamp; UL750; manufactured by HOYA Candeo Optronics Corporation) at 25 mJ/cm$^2$ (wavelength: 313 nm) through a wire grid polarizer at room temperature.

[Preparation of Optically Anisotropic Layer (Upper Layer)]

The following rod-like liquid crystal compound A (80 parts by mass), the following rod-like liquid crystal compound B (20 parts by mass), a photopolymerization initiator (IRGACURE 907, manufactured by BASF) (3 parts by mass), a sensitizer (KAYACURE-DETX, manufactured by Nippon Kayaku Co., Ltd.) (I part by mass), and the following horizontally aligning agent (0.3 parts by mass) were dissolved in methyl ethyl ketone (193 parts by mass) to prepare a solution for forming an optically anisotropic layer. The solution for forming an optically anisotropic layer was applied onto the binder layer imparted with an alignment function with a #2.2 wire bar coater, heated at 60° C. for 2 minutes, and irradiated with ultraviolet rays at an irradiation dose of 300 ml/cm$^2$ using an air-cooling metal halide lamp (manufactured by Eyegraphics Co., Ltd.) at 160 W/cm under purging with nitrogen such that an atmosphere with an oxygen concentration of 1.0% by volume or less was formed while maintaining the temperature at 60° C., thereby preparing an optically anisotropic layer.

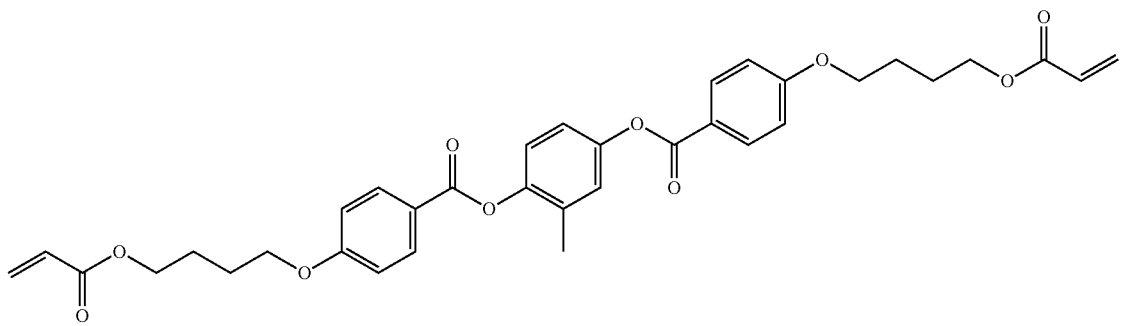

Rod-like liquid crystal compound A

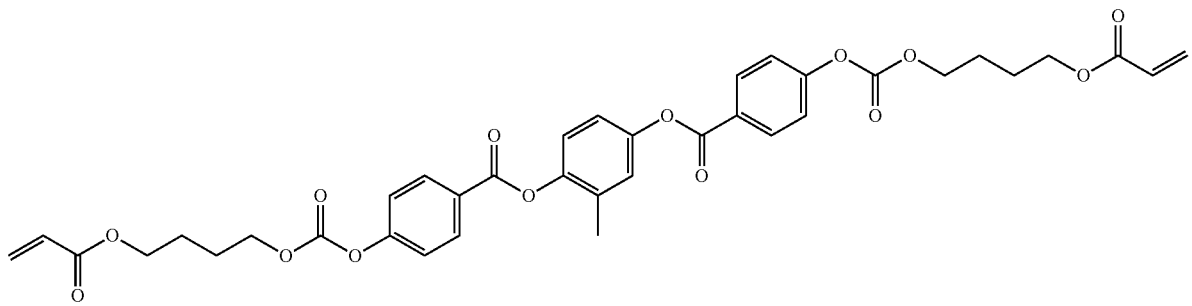

Rod-like liquid crystal compound B

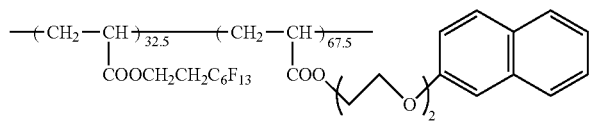

Horizontally aligning agent

Example 2

An optically anisotropic layer was prepared by the same method as in Example 1, except that the amount of the photo-alignable polymer KH1 to be added in Example 1 was changed to 0.5 parts by mass.

Example 3

An optically anisotropic layer was prepared by the same method as in Example 1, except that the epoxy monomer was changed to EPOLEAD GT401 (manufactured by Daicel Chemical Industries, Ltd.).

Example 4

[Preparation of Binder Layer]

An acryl monomer (PETA, manufactured by Osaka. Organic Chemical Industry Ltd.) (100 parts by mass), a photopolymerization initiator (IRGACURE 819, manufactured by BASF) (3 parts by mass), the photoacid generator (B-1-1) (5.0 parts by mass), and the photo-alignable polymer KH2 (2.0 parts by mass) were dissolved in methyl ethyl ketone (300 parts by mass) to prepare a solution for forming a binder layer. The prepared solution for forming a binder layer was spin-coated onto a glass substrate which had been washed, and irradiated with ultraviolet rays at an irradiation dose of 500 mJ/cm$^2$ using UV-LED at 365 nm at room temperature. Thereafter, the film was annealed at 120° C. for 1 minute to prepare a binder layer. The film thickness was about 3 μm. In addition, the surface energy of the binder layer was 50 mN/m.

Thereafter, the irradiating step (to impart an alignment function) and the preparation of the optically anisotropic layer (upper layer) were performed by the same method as in Example 1.

Example 5

An optically anisotropic layer was prepared by the same method in Example 4, except that the acryl monomer was changed to A-DPH (manufactured by Shin Nakamura Chemical Co., Ltd.).

Example 6

[Preparation of Support]

A cellulose acylate film (TD40UL, manufactured by Fujifilm Co., Ltd.) was passed through a dielectric heating roll at a temperature of 60° C. to raise the temperature of the film surface to 40° C., and then an alkali solution having the following composition was applied onto one surface of the film at a coating amount of 14 ml/m$^2$ using a bar coater, followed by heating at 110° C.

Subsequently, the film was transported for 10 seconds under a steam-type far-infrared heater manufactured by Noritake Co., Ltd.

Then, pure water was applied thereonto at 3 ml/m$^2$ using the same bar coater.

Subsequently, after repeating washing with water using a fountain coater and dehydration using an air knife three times, the film was transported to a drying zone at 70° C. for 10 seconds and dried to prepare a cellulose acylate film which had been subjected to an alkali saponification treatment, and the cellulose acylate film was used as a support.

| Composition of alkali solution | |
|---|---|
| Potassium hydroxide | 4.7 parts by mass |
| Water | 15.8 parts by mass |
| Isopropanol | 63.7 parts by mass |
| Surfactant (C$_{14}$H$_{29}$O(CH$_2$CH$_2$O)$_{20}$H) | 1.0 part by mass |
| Propylene glycol | 14.8 parts by mass |

[Formation of Alignment Layer Y1]

An alignment layer coating liquid having the following composition was continuously applied onto the cellulose acylate film which had been subjected to an alkali saponification treatment as described above, with a #14 wire bar. After the application, the film was dried with hot air at 60° C. for 60 seconds and further with hot air at 100° C. for 120 seconds. In addition, in the following composition, the "polymerization initiator (IN1)" represents a photopolymerization initiator (IRGACURE 2959, manufactured by BASF).

Subsequently, the coating film after drying was continuously subjected to a rubbing treatment to form an alignment layer Y1. At this time, the longitudinal direction of the long film was set to be in parallel with the transporting direction and the axis of rotation of the rubbing roller with respect to the longitudinal direction of the film was set to be in a 45° direction clockwise.

| Composition of alignment layer coating liquid | |
|---|---|
| Modified polyvinyl alcohol below | 10.0 parts by mass |
| Water | 371.0 parts by mass |
| Methanol | 119.0 parts by mass |
| Glutaraldehyde | 0.5 parts by mass |
| Polymerization initiator (IN1) | 0.3 parts by mass |

(In the following structural formula, the ratio is a molar ratio)

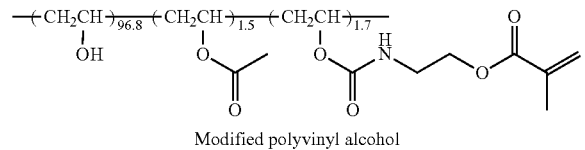

Modified polyvinyl alcohol

[Preparation of Binder Layer (Liquid Crystal Layer)]

The following rod-like liquid crystal compound A (80 parts by mass), the following rod-like liquid crystal compound B (20 parts by mass), a photopolymerization initiator (IRGACURE 819, manufactured by BASF) (3 parts by mass), the photoacid generator (B-1-1) (5.0 parts by mass) the following vertically aligning agent A (1 part by mass), the following vertically aligning agent B (0.5 parts by mass), and the photo-alignable polymer KH3 (3.0 parts by mass) were dissolved in 215 parts by mass of methyl ethyl ketone to prepare a solution for forming a liquid crystal layer. The prepared solution for forming a liquid crystal layer was applied onto the alignment layer Y1 with a 43.0 wire bar, heated at 70° C. for 2 minutes, cooled to 40° C., and then irradiated with ultraviolet rays at an irradiation dose of 500 mJ/cm$^2$ using UV-LED at 365 urn under purging with nitrogen such that an atmosphere with an oxygen concentration of 1.0% by volume or less was formed. Thereafter, the film was annealed at 120° C. for 1 minute to prepare a liquid crystal layer.

The film thickness was about 1 μm. In addition, the surface energy of the binder layer was 50 mN/m.

Thereafter, the irradiating, step (to impart an alignment function) and the preparation of the optically anisotropic layer (upper layer) were performed by the same method as in Example 1.

under purging with nitrogen such that an atmosphere with an oxygen concentration of 1.0% by volume or less was formed.

The film thickness was about 1 μm. In addition, the surface energy of the binder layer was 50 mN/m.

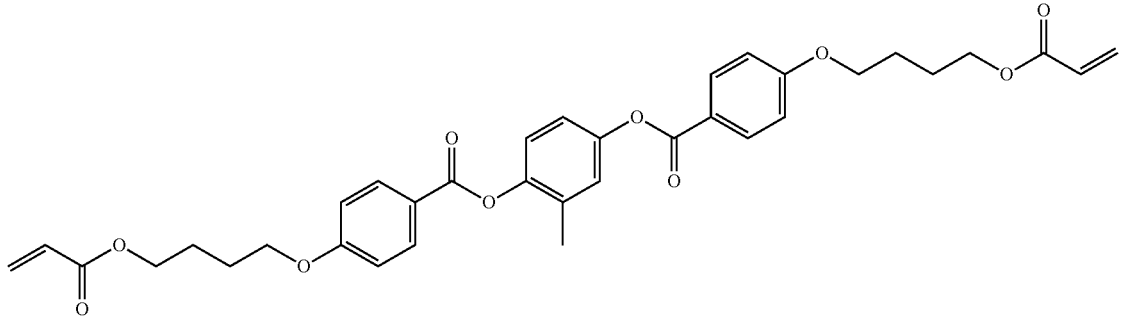

Rod-like liquid crystal compound A

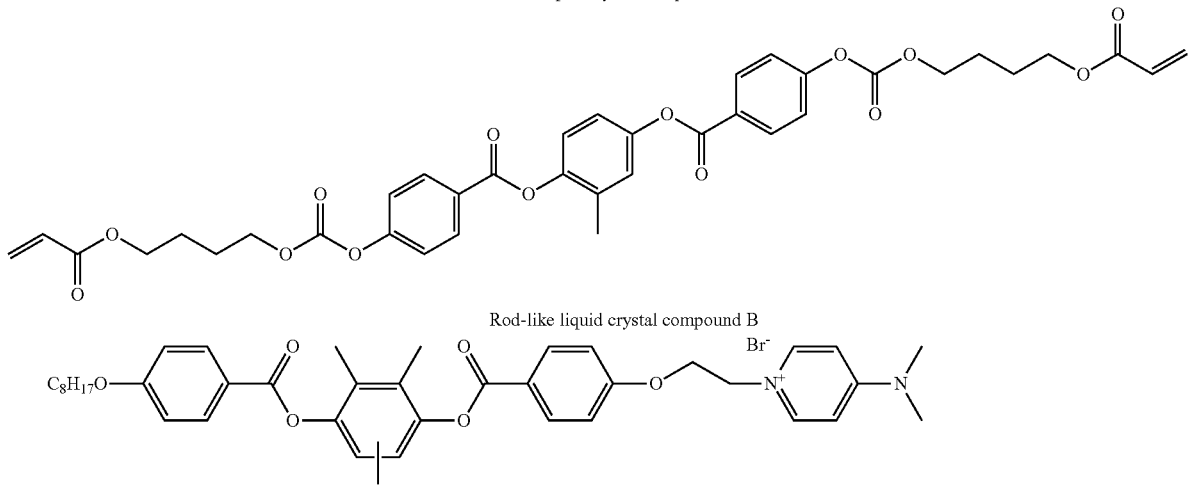

Rod-like liquid crystal compound B

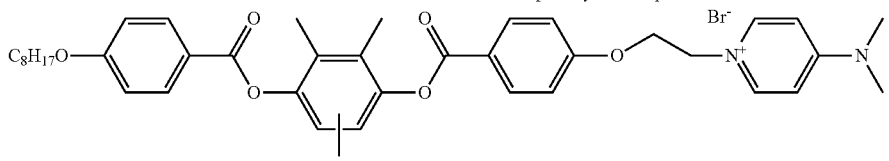

Vertically aligning agent A

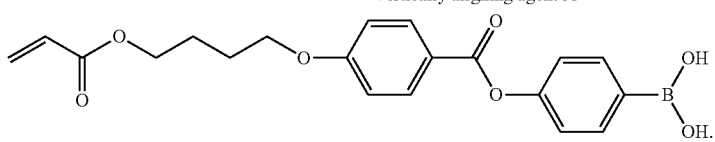

Vertically aligning agent B

Example 7

[Preparation of Binder Layer (Liquid Crystal Layer)]

The rod-like liquid crystal compound A (80 parts by mass), the rod-like liquid crystal compound B (20 parts by mass), photopolymerization initiator (IRGACURE 819, manufactured by BASF)(3 parts by mass), a vertically aligning agent A (1 part by mass), a vertically aligning agent B (0.5 parts by mass), and the photo-alignable polymer KH4 (4.0 parts by mass) were dissolved in 215 parts by mass of methyl ethyl ketone to prepare a solution for forming a liquid crystal layer. The prepared solution for forming a liquid crystal layer was applied onto the alignment layer Y1 formed on the support by the same method as in Example 6 with a #30 wire bar, heated at 70° C. for 2 minutes, cooled to 40° C., and then irradiated with ultraviolet rays at an irradiation dose of 500 mJ/cm² using UV-LED at 365 nm Thereafter, the irradiating step (to impart an alignment function) and the preparation of the optically anisotropic layer (upper layer) were performed by the same method as in Example 1. In addition, it was confirmed that a laminate of the binder layer and the optically anisotropic layer peeled from the support can be used.

Example 8

Preparation was performed by the same method as in Example 7, except that the photo-alignable polymer KH5 was used instead of the photo-alignable polymer KH4.

Example 9

Preparation was performed by the same method as in Example 7, except that the optically anisotropic layer (upper layer) was changed as follows.

[Preparation of Optically Anisotropic Layer (Upper Layer)]

The following composition A-1 was applied onto the binder layer prepared by the same method as in Example 7, using a bar coater. The formed coating film was heated with hot air at 135° C. and then cooled to 60° C., and the coating film was irradiated with ultraviolet rays at a wavelength of 365 nm at 100 mJ/cm$^2$ using a high-pressure mercury lamp under nitrogen atmosphere, and subsequently irradiated with ultraviolet rays at 500 mJ/cm$^2$ under heating to 120° C. to fix the alignment of the liquid crystal compound, thereby preparing an optically anisotropic layer.

| Composition A-1 | |
|---|---|
| Liquid crystal compound L-1 below | 39.00 parts by mass |
| Liquid crystal compound L-2 below | 39.00 parts by mass |
| Liquid crystal compound L-3 below | 17.00 parts by mass |
| Liquid crystal compound L-4 below | 5.00 parts by mass |
| Polymerization initiator PI-1 below | 0.50 parts by mass |
| Leveling agent T-1 below | 0.20 parts by mass |
| Cyclopentanone | 235.00 parts by mass |

Liquid crystal compound L-1

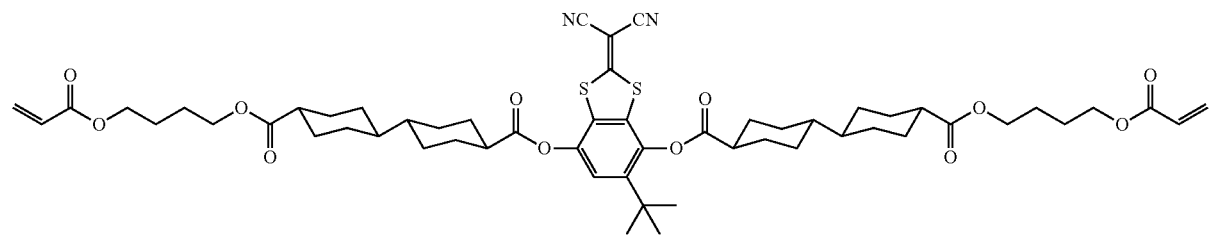

Liquid crystal compound L-2

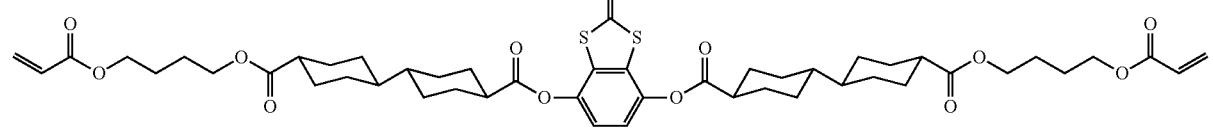

Liquid crystal compound L-3

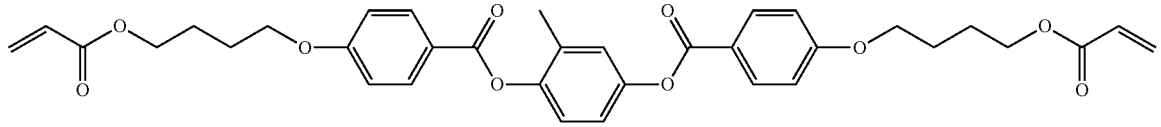

Liquid crystal compound L-4

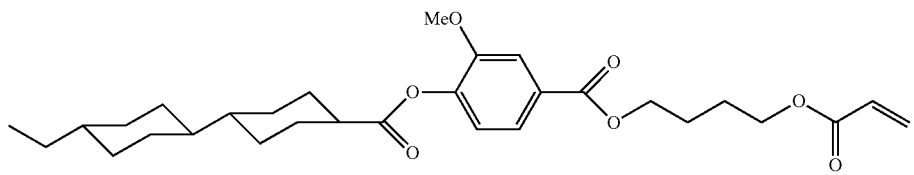

Polymerization initiator PI-1

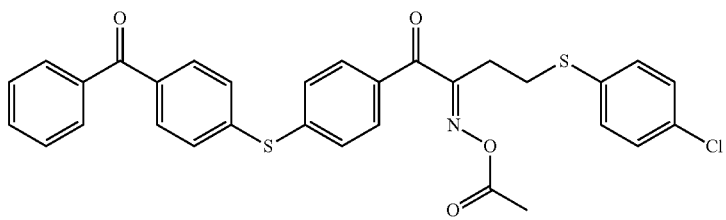

Leveling agent T-1

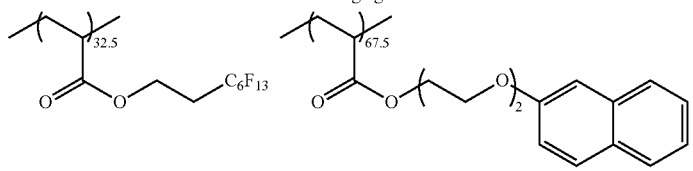

Comparative Example 1

Preparation was performed by the same method as in Example 1, except that the following photo-alignable polymer II was used instead of the photo-alignable polymer KH1.

Photo-Alignable Polymer II

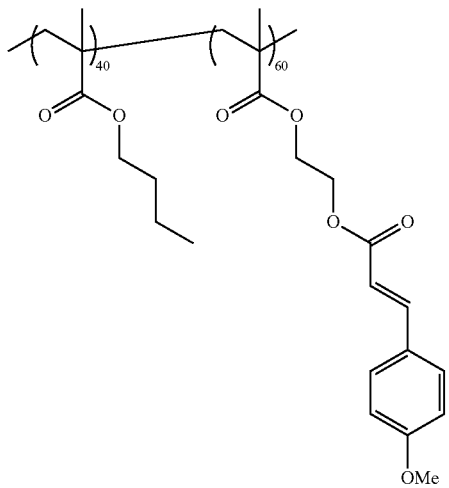

Comparative Example 2

Preparation was performed by the same method as in Example 7, except that the following photo-alignable polymer IV was used instead of the photo-alignable polymer KH4.

Photo-Alignable Polymer IV

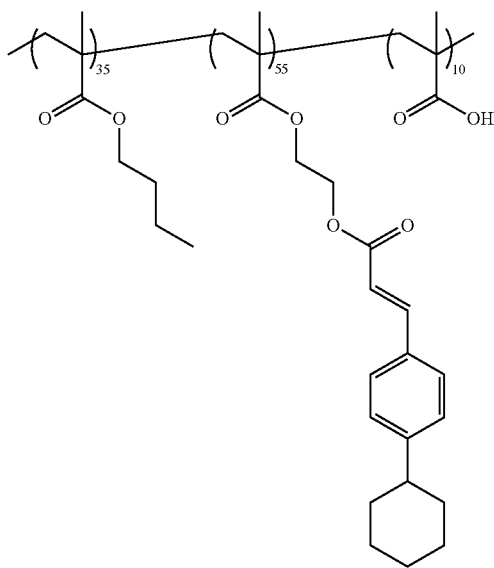

[Cissing]

For the prepared binder layer, a surface area in A4 size was examined, a failure appearing to be a loss in a circular or elliptical shape was regarded as cissing, and evaluation was performed according to the following standard. The results are shown in Table 2 below.

<Evaluation Standard>

A: Zero or one failure is observed.

B: Two to four failures are observed.

C: Five or more failures are observed.

[Wind Unevenness]

Two sheets of polarizing plates were arranged in the state of a cross nicol, a sample of the prepared binder layer was arranged therebetween, presence or absence of stripped irregularity was observed, and evaluation of the wind unevenness was performed according to the following standard. The results are shown in Table 2 below.

<Evaluation Standard>

A: Unevenness is not visually recognized.

B: Unevenness is substantially not visually recognized.

C: Unevenness can be visually recognized.

[Upper Layer Coating Properties]

The surface energy of the prepared binder layer was measured and the upper layer coating properties were evaluated according to the following standard. The results are shown in Table 2 below.

<Evaluation Standard>

A: 45 mN/m or more

B: 40 mN/m or more and less than 45 mN/m

C: 30 mN/m or more and less than 40 mN/m

D: Less than 30 mN/m

[Liquid Crystal Alignment Properties]

Two sheets of polarizing plates were arranged in the state of a cross nicol, a sample formed by lamination of the binder layer and the optically anisotropic layer, thus obtained, was arranged therebetween, and a degree of light leakage was observed and evaluated according to the following standard. The results are shown in Table 2 below.

<Evaluation Standard>

A: There is no light leakage.

B: There is substantially no light leakage.

C: Light leakage is observed.

TABLE 2

| | Binder layer | | | Evaluation | | | |
| --- | --- | --- | --- | --- | --- | --- | --- |
| | | photo-alignable polymer | | | | | |
| | Binder (polymerizable compound) | Type | Content (parts by mass) | Cissing | Wind unevenness | Upper layer coating properties | Liquid crystal alignment properties |
| Example 1 | CEL2021P | KH1 | 2.0 | A | A | A | A |
| Example 2 | CEL2021P | KH1 | 0.5 | A | A | A | A |
| Example 3 | EPOLEAD GT401 | KH1 | 2.0 | A | A | A | A |
| Example 4 | PETA | KH2 | 2.0 | A | A | A | A |
| Example 5 | A-DPH | KH2 | 2.0 | A | A | A | A |
| Example 6 | Liquid crystal compounds A and B | KH3 | 3.0 | A | A | A | A |
| Example 7 | Liquid crystal compounds A and B | KH4 | 4.0 | A | A | A | A |
| Example 8 | Liquid crystal compounds A and B | KH5 | 4.0 | A | A | A | A |
| Example 9 | Liquid crystal compounds L-1, L-2, L-3, and L-4 | KH5 | 4.0 | A | A | A | A |
| Comparative Example 1 | CEL2021P | II | 2.0 | C | C | C | C |
| Comparative Example 2 | Liquid crystal compounds A and B | IV | 4.0 | C | C | C | C |

From the results shown in Tables 1 and 2, it could be seen that in a case of using the photo-alignable polymers II and IV corresponding to surfactants known in the related art, the coating properties (cissing) and the wind unevenness during formation of the binder layer, and the upper layer coating properties and the liquid crystal alignment properties of the formed binder layer were all deteriorated (Comparative Examples 1 and 2).

In contrast, it could be seen that in a case of using the photo-alignable polymer which has a repeating unit including a cleavage group capable of decomposing by an action of light or the like to generate a polar group in a side chain, has a fluorine atom or a silicon atom on a side closer to a terminal than the cleavage group in the side chain, and has a photo-alignable group such that predetermined conditions are satisfied, the coating properties (cissing) during formation of the binder layer are excellent, the wind unevenness can be suppressed, and the coating properties with respect to the upper layer coating liquid and the liquid crystal alignment properties of the formed binder layer are also good (Examples 1 to 9).

Example 10

Preparation was performed by the same method as in Example 7, except that the optically anisotropic layer (upper layer) was changed as follows.

[Preparation of Optically Anisotropic Layer (Upper Layer)]

A coating liquid R1 for a cholesteric liquid crystal layer with the following composition was prepared.

| Coating liquid R1 for cholesteric liquid crystal layer | |
| --- | --- |
| Disc-like liquid crystal compound (compound 101 below) | 80 parts by mass |
| Disc-like liquid crystal compound (compound 102 below) | 20 parts by mass |
| Polymerizable monomer 1 below | 10 parts by mass |
| Surfactant 1 below | 0.3 parts by mass |
| Polymerization initiator 1 below | 3 parts by mass |
| Chiral agent 1 agent | 3.03 parts by mass |
| Methyl ethyl ketone | 290 parts by mass |
| Cyclohexanone | 50 parts by mass |

Compound 101

Compound 102

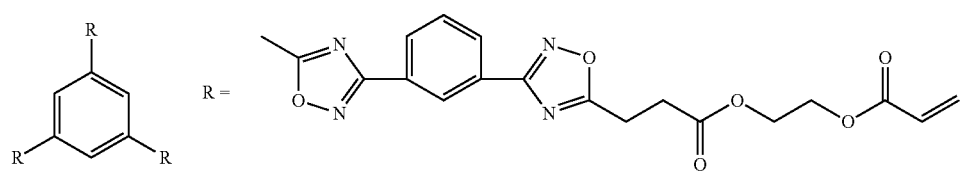

-continued

Polymerizable monomer 1

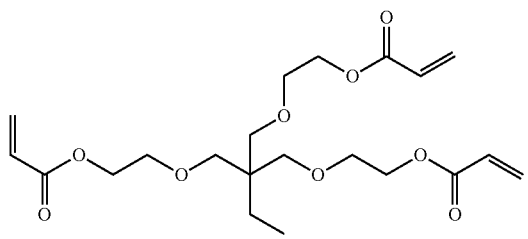

Surfactant 1

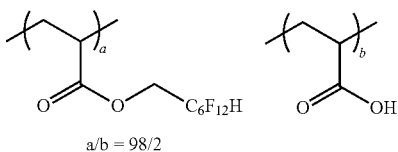

a/b = 98/2

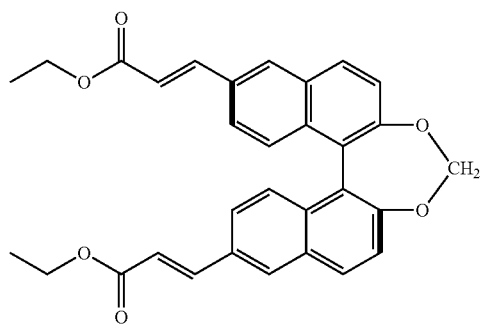

Chiral agent 1

The prepared coating liquid R1 for a cholesteric liquid crystal layer was applied onto the binder layer prepared by the same method as in Example 7, using a bar coater. Subsequently, the applied film was dried at 70° C. for 2 minutes, the solvent was evaporated, and then the residue was aged under heating at 115° C. for 3 minutes to obtain a uniform alignment state. Thereafter, the applied film was maintained at 45° C. and irradiated with ultraviolet rays (300 mJ/cm$^2$) using a high-pressure mercury lamp under a nitrogen atmosphere to form a cholesteric liquid crystal layer R1 that reflects red right-handed circularly polarized light. A cross-section of the cholesteric liquid crystal layer R1 was observed with a scanning electron microscope (SEM), and as a result, the film thickness was 2.8 μm.

For the samples prepared in Example 10, the cissing, the wind unevenness, and the upper layer coating properties were evaluated in the same manner as Table 2, and were thus rated as A. Further, for the liquid crystal alignment properties, it could be confirmed that the cholesteric layer was aligned without defects by observation through SEM. In addition, it was confirmed that as parallel light at 650 nm was incident, circularly polarized light components were specularly reflected without problems.

What is claimed is:

1. A photo-alignable polymer comprising a repeating unit A including a cleavage group capable of decomposing by an action of at least one selected from the group consisting of light, heat, an acid, and a base to generate a polar group,
   wherein the repeating unit A has the cleavage group in a side chain and has a fluorine atom or a silicon atom on a side closer to a terminal than the cleavage group in the side chain, and
   the photo-alignable polymer satisfies Condition 1 or Condition 2 shown below:
   Condition 1: the photo-alignable polymer further has a repeating unit B including a photo-alignable group, in addition to the repeating unit A; and
   Condition 2: the repeating unit A includes the photo-alignable group on a side closer to the main chain than the cleavage group in the side chain, when the photo-alignable polymer satisfies Condition 1,
the repeating unit A is a repeating unit represented by Formula (1) or a repeating unit represented by Formula (2-1) or (2-2), and
the repeating unit B is a repeating unit represented by Formula (3) or a repeating unit represented by Formula (4-1) or (4-2),

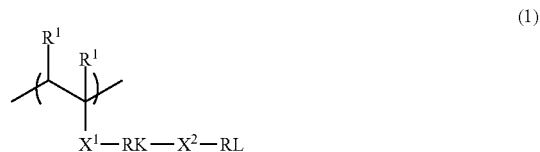

(1)

(2-1)

(2-2)

(3)

(4-1)

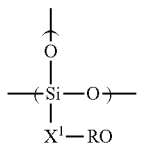
(4-2)

in Formulae (1), (2-1), (3), and (4-1), $R^1$ represents a hydrogen atom or an alkyl group having 1 to 3 carbon atoms, and a plurality of $R^1$'s in Formulae (1) and (3) may be the same as or different from each other, in Formulae (1), (2-1), and (2-2), $X^1$ and $X^2$ each independently represent a single bond or a divalent linking group, RK represents the cleavage group, and RL represents a monovalent organic group including a fluorine atom or a silicon atom, and in Formulae (3), (4-1), and (4-2), $X^1$ represents a single bond or a divalent linking group and RO represents the photo-alignable group, when the photo-alignable polymer satisfies Condition 2, and the repeating unit A is a repeating unit represented by Formula (5) or a repeating unit represented by Formula (6-1) or (6-2),

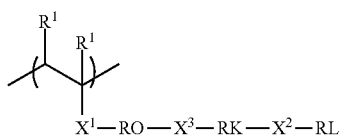
(5)

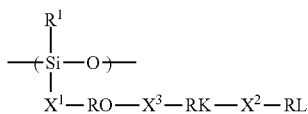
(6-1)

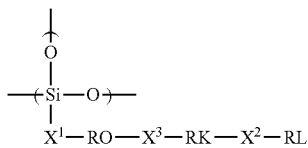
(6-2)

in Formulae (5) and (6-1), $R^1$ represents a hydrogen atom or an alkyl group having 1 to 3 carbon atoms and a plurality of $R^1$'s in Formula (5) may be the same as or different from each other, and in Formulae (5), (6-1), and (6-2), $X^1$, $X^2$, and $X^3$ each independently represent a single bond or a divalent linking group, RK represents the cleavage group, RL represents a monovalent organic group including a fluorine atom or a silicon atom, and RO represents the photo-alignable group.

2. The photo-alignable polymer according to claim 1, wherein RK in Formulae (1), (2-1), and (2-2) is a cleavage group represented by any one of Formula (rk-1), . . . , or (rk-13),

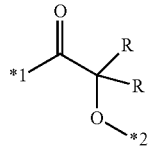
(rk-1)

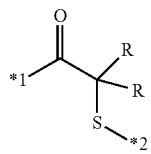
(rk-2)

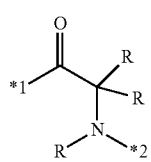
(rk-3)

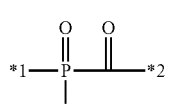
(rk-4)

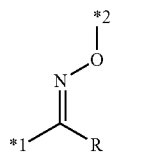
(rk-5)

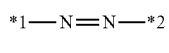
(rk-6)

(rk-7)

(rk-8)

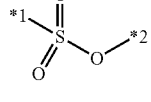
(rk-9)

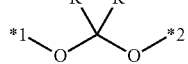
(rk-10)

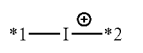
(rk-11)

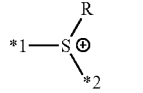
(rk-12)

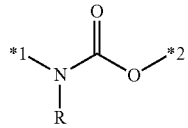
(rk-13)

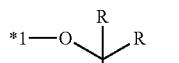

in Formulae (rk-1) to (rk-13), *1 represents a binding position to any one of $X^1$ and $X^2$ in Formulae (1), (2-1), and (2-2), *2 represents a binding position to the other of $X^1$ or $X^2$ not bonded to *1 in Formulae (1), (2-1), and (2-2), and R's each independently represent a hydrogen atom or a monovalent organic group.

3. The photo-alignable polymer according to claim 1, wherein RK in Formulae (5), (6-1), and (6-2) is a cleavage group represented by any one of Formula (rk-1), ..., or (rk-13),

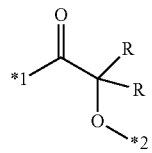
(rk-1)

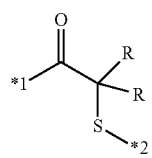
(rk-2)

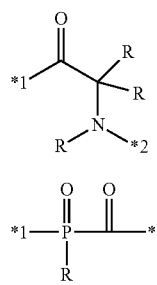
(rk-3)

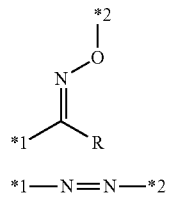
(rk-4)

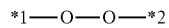
(rk-5)

*1—N=N—*2 (rk-6)

*1—O—O—*2 (rk-7)

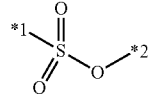
(rk-8)

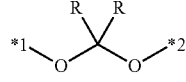
(rk-9)

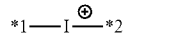
(rk-10)

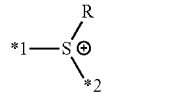
(rk-11)

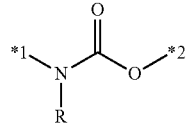
(rk-12)

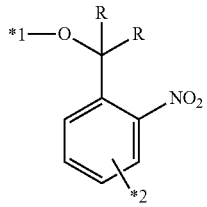
(rk-13)

in Formulae (rk-1) to (rk-13), *1 represents a binding position to any one of $X^3$ or $X^2$ in Formulae (5), (6-1), and (6-2), *2 represents a binding position to the other of $X^3$ or $X^2$ not bonded to *1 in Formulae (5), (6-1), and (6-2), and R's each independently represent a hydrogen atom or a monovalent organic group.

4. The photo-alignable polymer according to claim 1, wherein the photo-alignable polymer satisfies Condition 1, and the repeating unit A is a repeating unit represented by Formula (7), and the repeating unit B is a repeating unit represented by Formula (8),

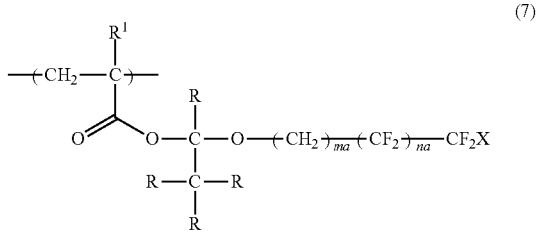
(7)

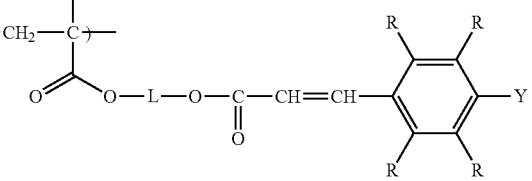
(8)

in Formulae (7) and (8), $R^1$ represents a hydrogen atom or an alkyl group having 1 to 3 carbon atoms, R represents a hydrogen atom or a monovalent organic group, and a plurality of R's may be the same as or different from each other, in Formula (7), X represents a hydrogen atom or a fluorine atom, and ma and na each independently represent an integer of 1 to 20, and in Formula (8), L represents a divalent linking group and Y represents a hydrogen atom or a monovalent organic group.

5. A binder composition comprising:
a binder; and
the photo-alignable polymer according to claim 1.

6. A binder layer formed using the binder composition according to claim 5.

7. An optical laminate comprising:
the binder layer according to claim 6; and
an optically anisotropic layer provided on the binder layer,
wherein the optically anisotropic layer is formed using a polymerizable liquid crystal composition containing a polymerizable liquid crystal compound, and the binder layer and the optically anisotropic layer are laminated in adjacent to each other.

8. A method for producing an optical laminate, comprising:
- a first applying step of applying the binder composition according to claim 5 onto a support;
- a binder layer forming step of forming a binder layer after the first applying step;
- an action performing step of performing an action of at least one selected from the group consisting of light, heat, an acid, and a base;
- a light irradiating step of irradiating polarized light or unpolarized light;
- a second applying step of directly applying a polymerizable liquid crystal composition for forming an optically anisotropic layer onto the binder layer; and
- an optically anisotropic layer forming step of forming an optically anisotropic layer after the second applying step,
- wherein the action performing step is a step performed between the binder layer forming step and the second applying step or performed at the same time with the binder layer forming step or the second applying step, and
- the light irradiating step is a step performed between the binder layer forming step and the second applying step or performed at the same time with the binder layer forming step or the second applying step.

9. An image display device comprising the binder layer according to claim 6.

10. An image display device comprising the optical laminate according to claim 7.

11. The photo-alignable polymer according to claim 1, wherein RK in Formulae (1), (2-1), and (2-2) is a cleavage group represented by any one of Formula (rk-1), (rk-3) . . . , or (rk-13),

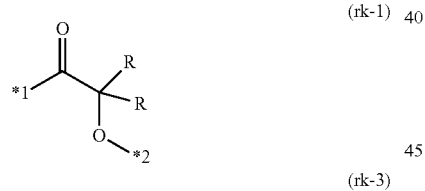
(rk-1)

(rk-3)

(rk-4)

(rk-5)

(rk-6)

*1—N═N—*2

*1—O—O—*2
(rk-7)

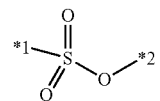
(rk-8)

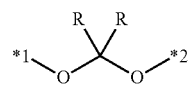
(rk-9)

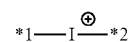
(rk-10)

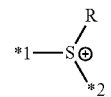
(rk-11)

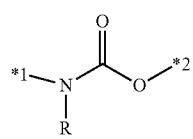
(rk-12)

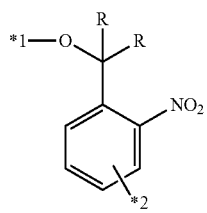
(rk-13)

in Formulae (rk-1) and (rk-3) to (rk-13), *1 represents a binding position to any one of $X^1$ and $X^2$ in Formulae (1), (2-1), and (2-2), *2 represents a binding position to the other of $X^1$ or $X^2$ not bonded to *1 in Formulae (1), (2-1), and (2-2), and R's each independently represent a hydrogen atom or a monovalent organic group.

12. The photo-alignable polymer according to claim 1, wherein RK in Formulae (5), (6-1), and (6-2) is a cleavage group represented by any one of Formula (rk-1), (rk-3) . . . , or (rk-13),

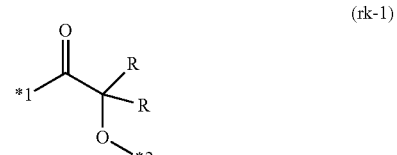
(rk-1)

(rk-3)

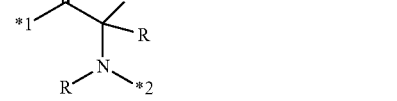
(rk-4)

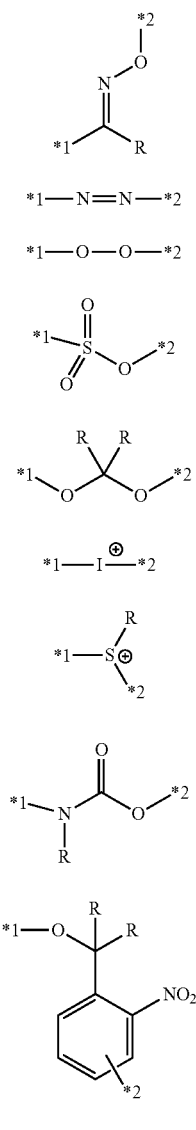

in Formulae (rk-1) and (rk-3) to (rk-13), *1 represents a binding position to any one of $X^3$ or $X^2$ in Formulae (5), (6-1), and (6-2), *2 represents a binding position to the other of $X^3$ or $X^2$ not bonded to *1 in Formulae (5), (6-1), and (6-2), and R's each independently represent a hydrogen atom or a monovalent organic group.

13. The photo-alignable polymer according to claim 1, wherein RK in Formulae (1), (2-1), and (2-2) is a cleavage group represented by any one of Formula (rk-1), (rk-3), (rk-4), (rk-5), (rk-6), (rk-7), (rk-8), (rk-9), (rk-10), (rk-12), or (rk-13),

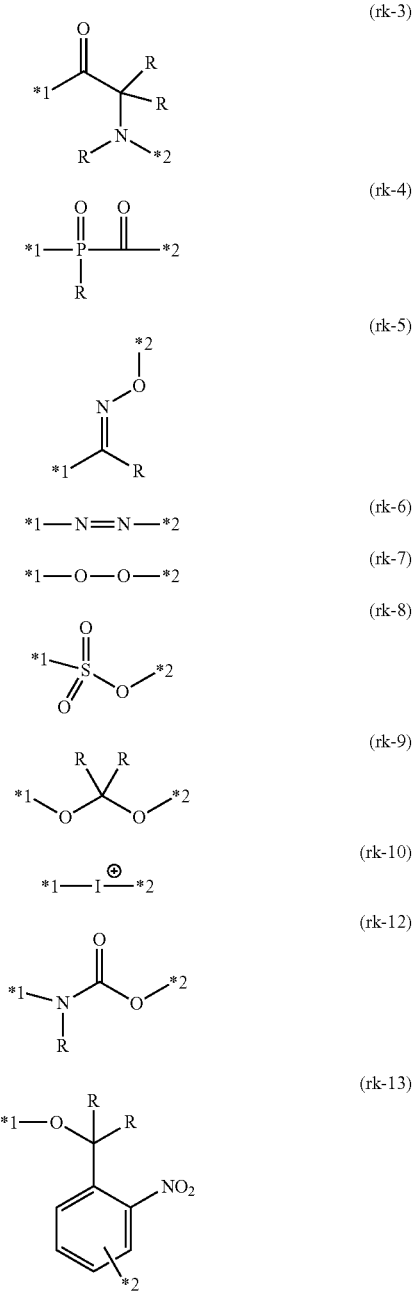

in Formulae (rk-1), (rk-3), (rk-4), (rk-5), (rk-6), (rk-7), (rk-8), (rk-9), (rk-10), (rk-12), and (rk-13), *1 represents a binding position to any one of $X^1$ and $X^2$ in Formulae (1), (2-1), and (2-2), *2 represents a binding position to the other of $X^1$ or $X^2$ not bonded to *1 in Formulae (1), (2-1), and (2-2), and R's each independently represent a hydrogen atom or a monovalent organic group.

14. The photo-alignable polymer according to claim 1, wherein RK in Formulae (5), (6-1), and (6-2) is a cleavage group represented by any one of Formula (rk-1), (rk-3), (rk-4), (rk-5), (rk-6), (rk-7), (rk-8), (rk-9), (rk-10), (rk-12), or (rk-13),

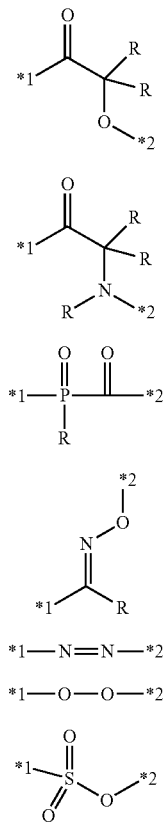
(rk-1)
(rk-3)
(rk-4)
(rk-5)
(rk-6)
(rk-7)
(rk-8)
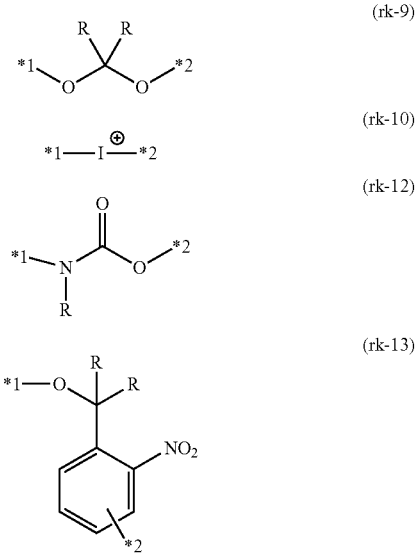
(rk-9)
(rk-10)
(rk-12)
(rk-13)
in Formulae (rk-1), (rk-3), (rk-4), (rk-5), (rk-6), (rk-7), (rk-8), (rk-9), (rk-10), (rk-12), and (rk-13), *1 represents a binding position to any one of $X^3$ or $X^2$ in Formulae (5), (6-1), and (6-2), *2 represents a binding position to the other of $X^3$ or $X^2$ not bonded to *1 in Formulae (5), (6-1), and (6-2), and R's each independently represent a hydrogen atom or a monovalent organic group.
* * * * *